(12) United States Patent
Nagai et al.

(10) Patent No.: US 8,111,360 B2
(45) Date of Patent: Feb. 7, 2012

(54) TRANSFLECTIVE LCD UNIT

(75) Inventors: Horoshi Nagai, Kanagawa (JP);
Michiaki Sakamoto, Kanagawa (JP);
Kenichi Mori, Kanagawa (JP);
Kenichirou Naka, Kanagawa (JP)

(73) Assignee: NLT Technologies, Ltd., Kanagawa (JP)

( * ) Notice: Subject to any disclaimer, the term of this patent is extended or adjusted under 35 U.S.C. 154(b) by 831 days.

(21) Appl. No.: 12/201,860

(22) Filed: Aug. 29, 2008

(65) Prior Publication Data

US 2009/0059107 A1  Mar. 5, 2009

(30) Foreign Application Priority Data

Aug. 30, 2007  (JP) .................................. 2007-223991

(51) Int. Cl.
*G02F 1/1335*  (2006.01)
(52) U.S. Cl. ........................................ 349/117; 349/114
(58) Field of Classification Search .................. 349/114, 349/117
See application file for complete search history.

(56) References Cited

U.S. PATENT DOCUMENTS 7,630,044 B2 * 12/2009 Baek ............................. 349/141
2004/0004681 A1 * 1/2004 Ozawa et al. ................... 349/61

FOREIGN PATENT DOCUMENTS

| JP | 2003344837 A | 12/2003 |
| JP | 2006171376 A | 6/2006 |
| JP | 2007041572 A | 2/2007 |

* cited by examiner

*Primary Examiner* — Phu Vu
(74) *Attorney, Agent, or Firm* — Sughrue Mion, PLLC

(57) ABSTRACT

A transflective LCD unit includes an array of pixels each including a reflective area and a transmissive area. The LC layer has an effective retardation of $\lambda/4$ in the reflective area, and an effective retardation of $\lambda/2$ in the transmissive area. A retardation film disposed in the reflective area provides a retardation of $\lambda/2$ to the light passed thereby. An angle of $\theta$ between the optical axis of the retardation film and the polarized direction of the light is in a range of 0 degree$<\theta<$22.5 degrees.

25 Claims, 26 Drawing Sheets

FIG. 5A
FIG. 5B
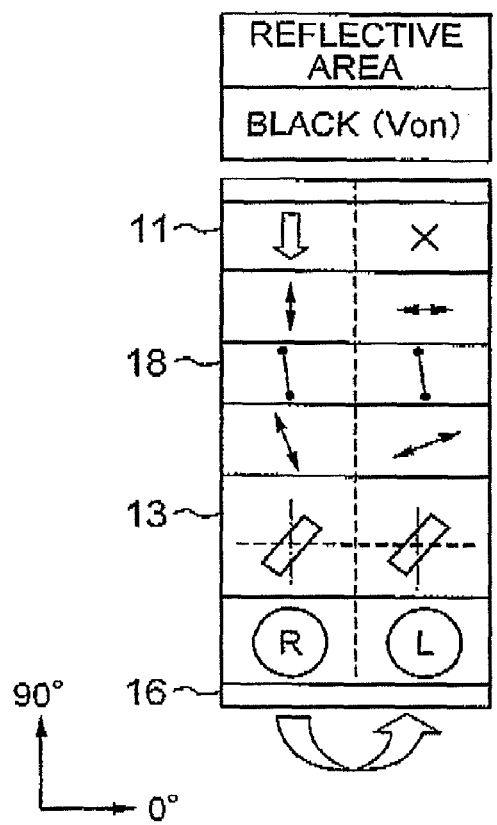
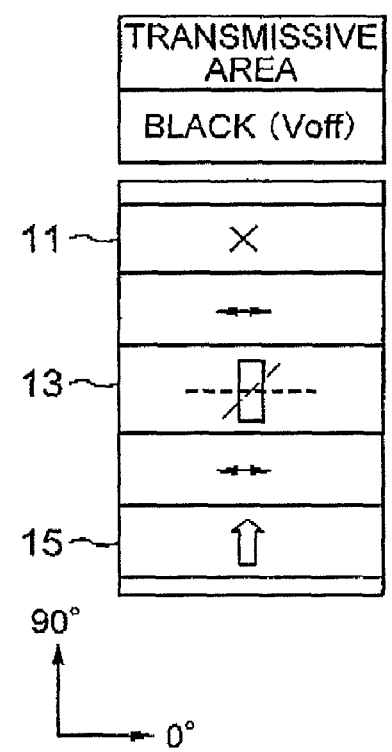

21 REFLECTIVE AREA

22 TRANSMISSIVE AREA

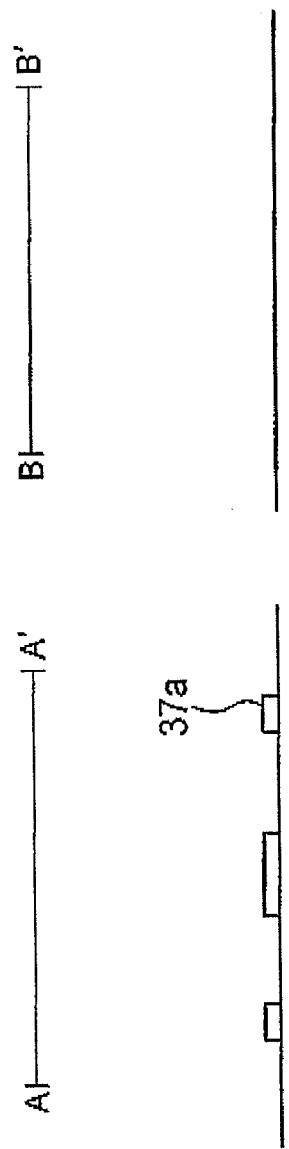
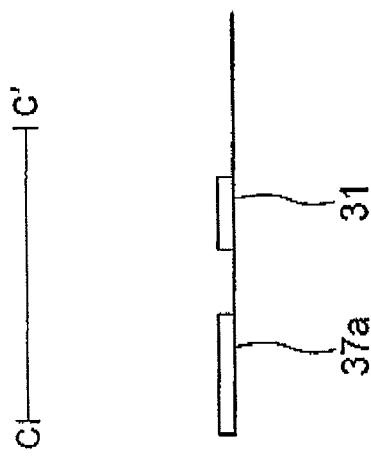
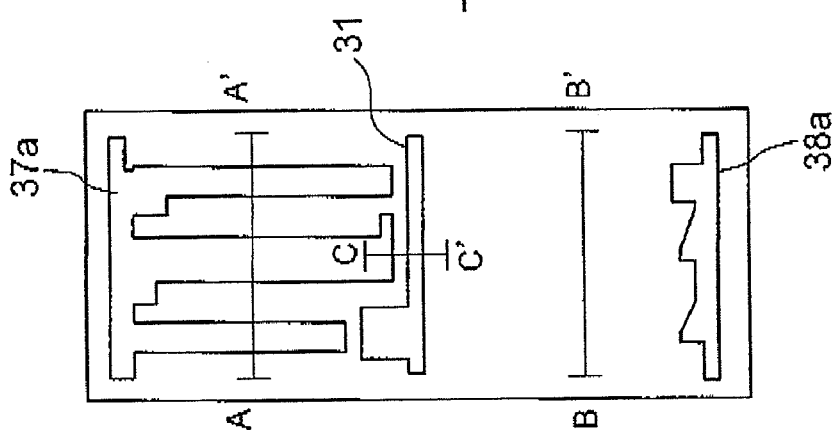

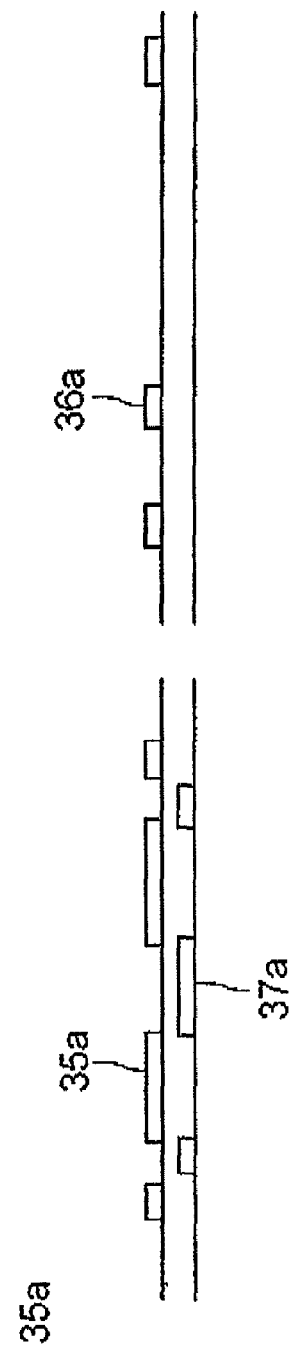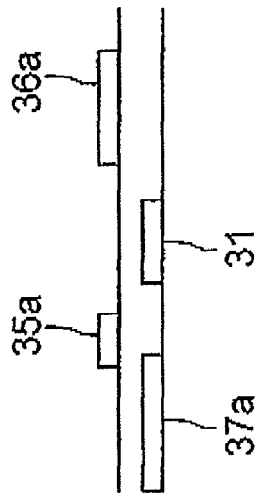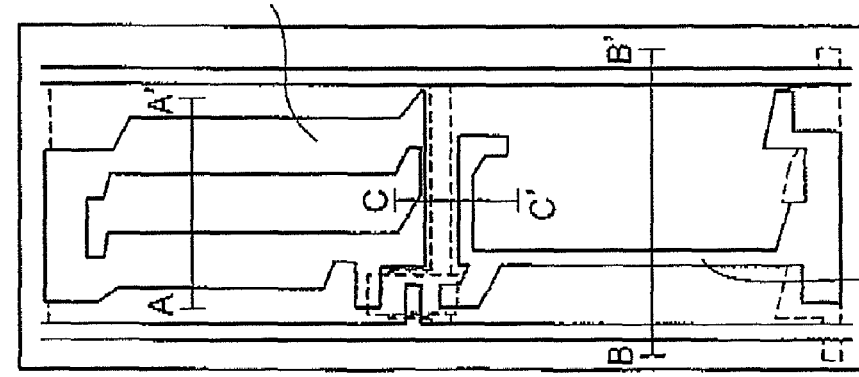

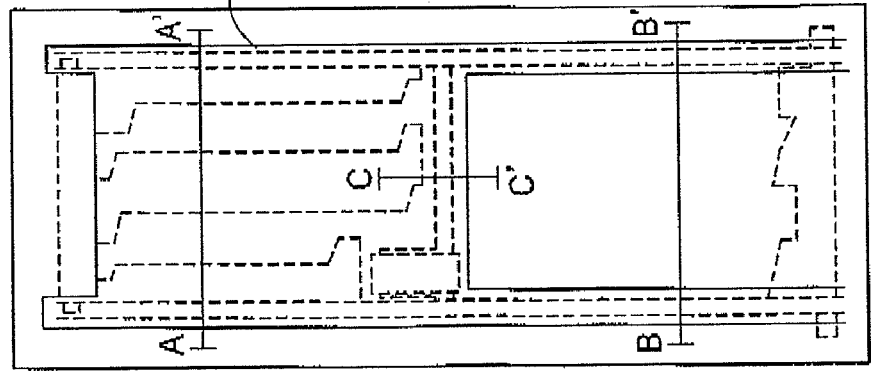
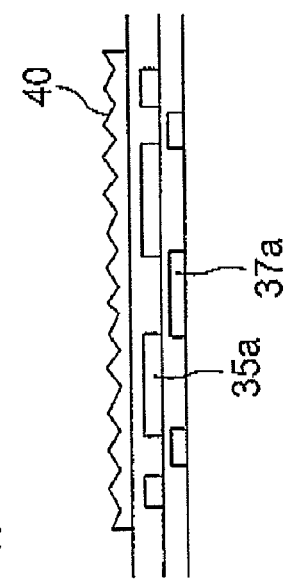
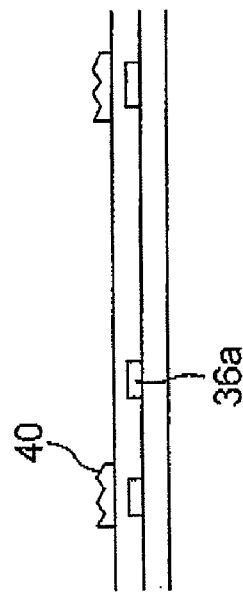
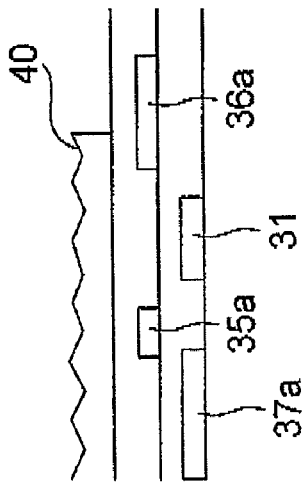
FIG. 14
FIG. 14A
FIG. 14B
FIG. 14C

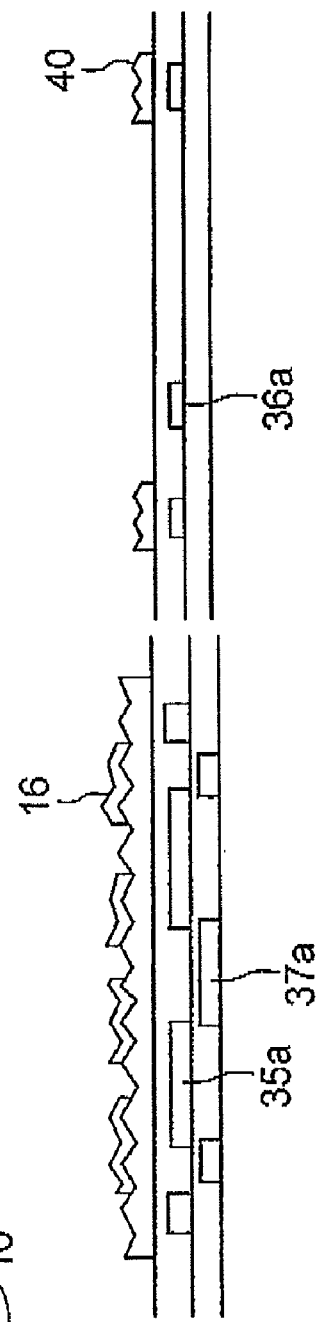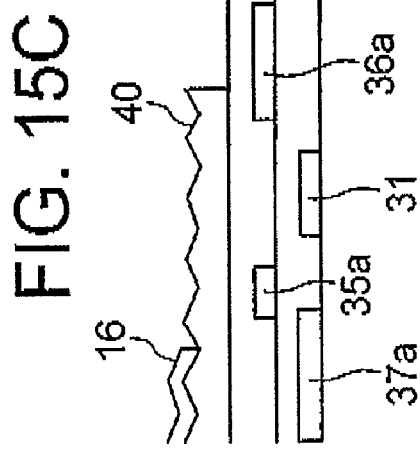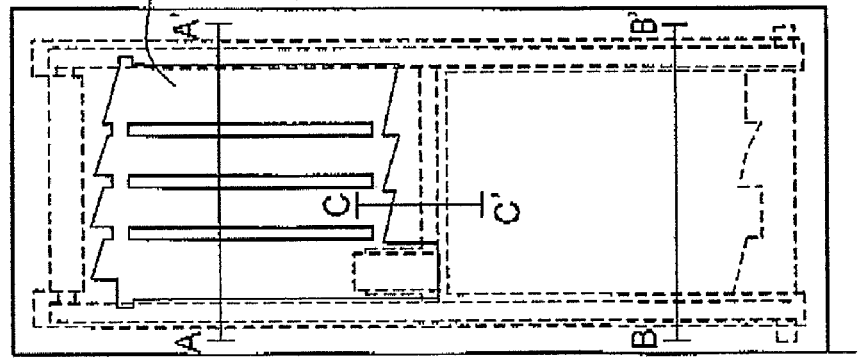

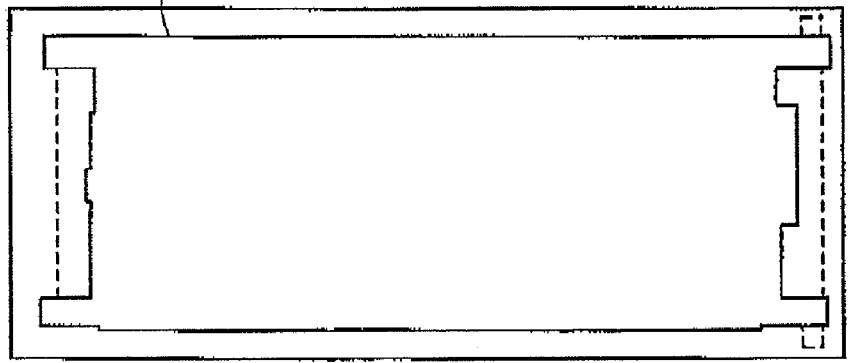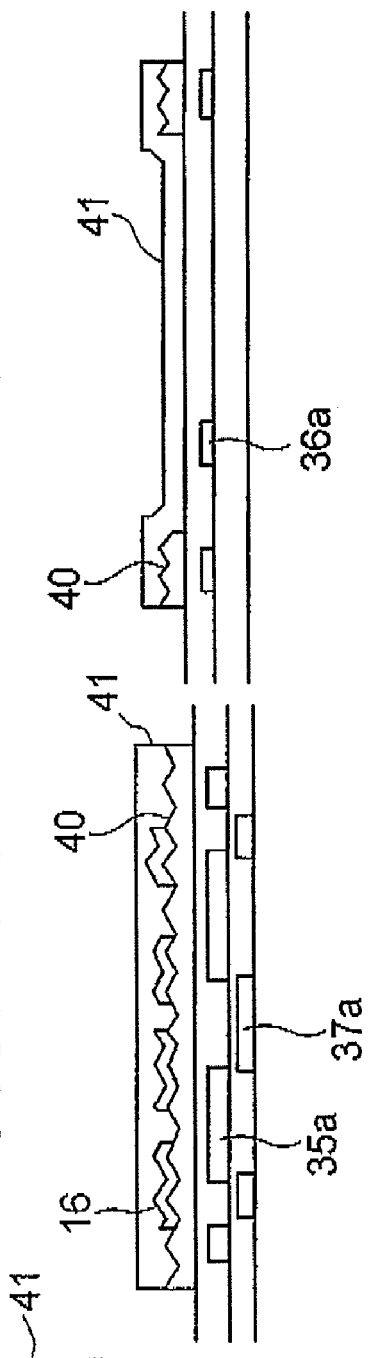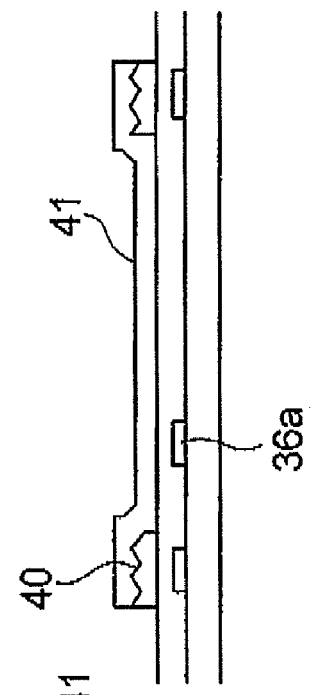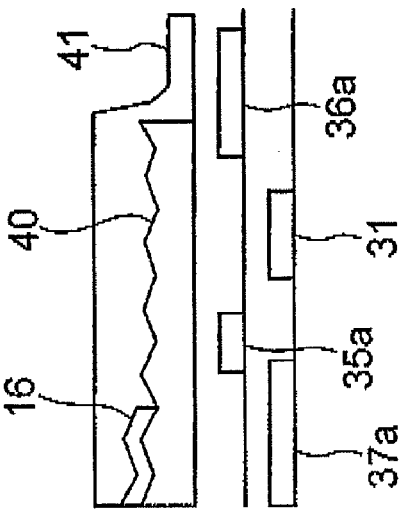

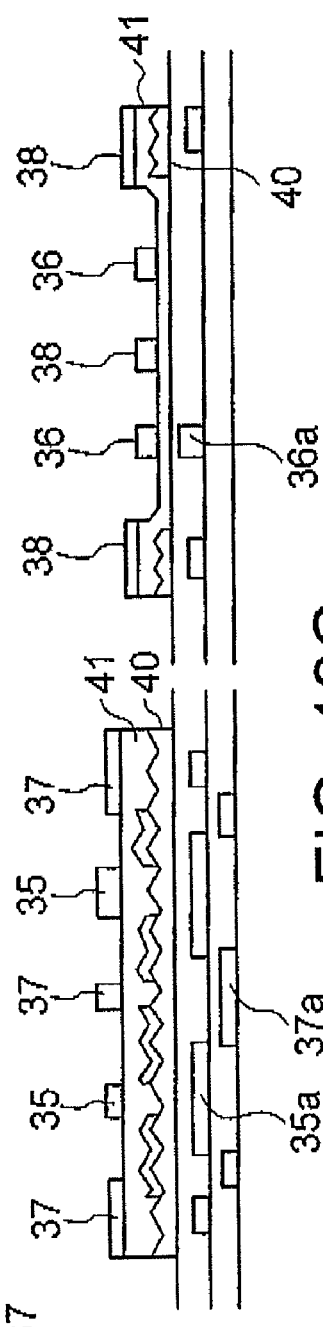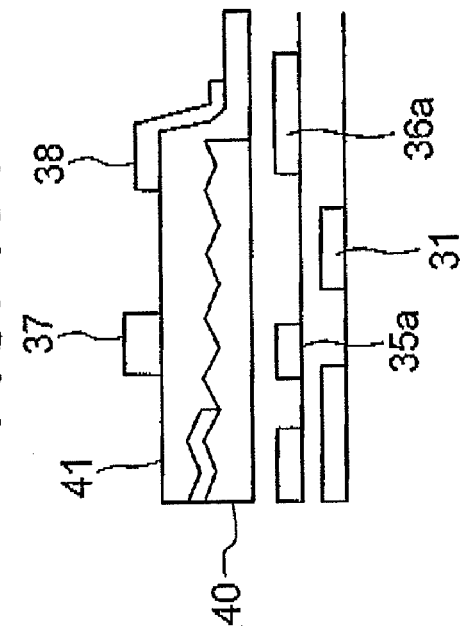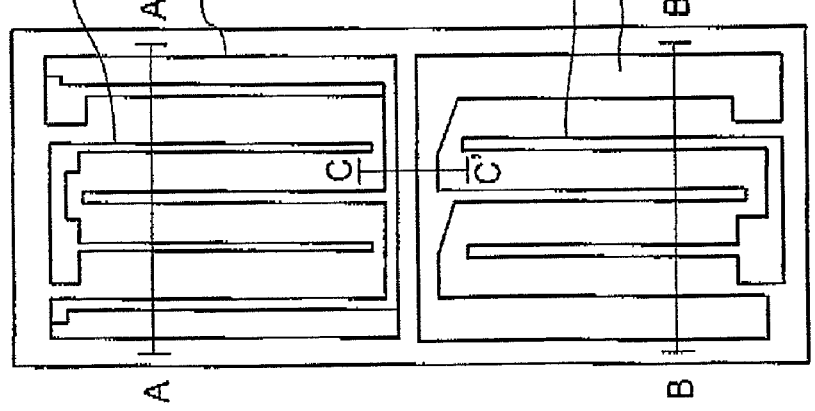

TRANSFLECTIVE LCD UNIT

This application is based upon and claims the benefit of priority from Japanese patent application No. 2007-223991 filed on Aug. 30, 2007, the disclosure of which is incorporated herein in its entirety by reference.

TECHNICAL FIELD

The present invention relates to a transflective liquid crystal display (LCD) unit and, more particularly, to a transflective LCD unit including a reflective area and a transmissive area in each pixel and operating in an in-plane-switching (IPS) mode such as a lateral-electric-field.

BACKGROUND ART

LCD units are roughly categorized into two groups including a transmissive LCD unit and a reflective LCD unit. In general, the transmissive LCD unit includes a backlight source, and controls the intensity of backlight passed by a liquid crystal (LC) layer to display an image thereon. The reflective LCD includes a reflector that reflects light incident from outside the LCD unit, and uses the light reflected by the reflector to display an image thereon. The reflective LCD unit, which does not use the backlight source, has the advantages of lower power dissipation, smaller thickness and smaller weight. However, the reflective LCD unit suffers from a lower visibility in a dark environment due to use of the dim ambient light.

A transflective LCD unit is known as a LCD unit having the advantages of both the transmissive LCD unit and reflective LCD unit (for example, refer to JP-2003-344837A (Patent Publication 1)). The transflective LCD includes a transmissive area and a reflective area in each of the pixels in the LCD unit. The transmissive area passes the light emitted by the backlight source to use the backlight from the backlight source as the light for display. The reflective area includes a reflector that reflects light from outside the LCD unit, to use the light reflected by the reflector as the light of display. In the transflective LCD, the backlight source is turned OFF in a bright environment to save the power source, and turned ON in a dark environment to use the backlight source for display of an image in the dark environment.

Modes for driving a LCD unit include an IPS mode such as a lateral-electric-filed mode and a fringe-electric-field mode. The IPS-mode LCD unit includes, in each pixel, a pixel electrode and a common electrode which were juxtaposed on the same substrate and apply therebetween a lateral electric field to the LC layer. The IPS-mode LCD unit achieves a wider-viewing-angle characteristic compared to a twisted-nematic-mode (TN-mode) LCD unit, due to a lateral rotation of LC molecules in the LC layer, i.e., rotation in the direction parallel to the substrate surface.

There is a known technique for driving a transflective lateral-electric-field-mode LCD unit including the transmissive area and reflective area, which may be referred to as simply transflective LCD unit hereinafter, in a normally-black drive mode, as described in JP-2006-171376A (Patent Publication 2). In this technique, the normally-black drive mode is achieved by allowing the LC layer in the reflective area to act as a $\lambda/4$ film with respect to a light having a wavelength ($\lambda$) of 550 nm, allowing the LC layer in the transmissive area to act as a $\lambda/2$ film with respect to a light having the same wavelength, and interposing a $\lambda/2$ retardation film between the polarizing film and the LC layer in the reflective area.

It is also known to drive the transmissive area and reflective area in the transflective LCD unit by using an inverted driving scheme without using the $\lambda/2$ film (refer to JP-2007-041572A (Patent Publication 3)). In this technique, the reflective area and transmissive area in each pixel are provided with respective data lines for supply of data signals, respective switches for switching between the data lines, respective pixel electrodes, and respective common electrodes. The LC layer in the reflective area and the LC layer in the transmissive area are driven in an inverted drive scheme wherein the intensity of the electric field applied to the LC layer by the pixel electrode and the common electrode is opposite between the reflective area and the transmissive area. The inverted driving scheme is such that when the LC layer in the reflective area is not applied with a voltage to display a bright state (white), the LC layer in the transmissive area is applied with a full voltage to display a bright state (W), and vice versa, and such that when the applied voltage in the reflective area is lowered from the full voltage, the applied voltage in the transmissive area is raised from the zero volt, and vice versa. The inverted driving scheme achieves the bright state in both the reflective area and transmissive area as well as the dark state in both the areas.

DESCRIPTION OF THE INVENTION

Problem Solved by the Invention

In the transflective LCD unit as described in Patent Publication 3, the retardation coefficient ($\Delta n$) of the LC layer is substantially equivalent between the reflective area and the transmissive area. Accordingly, in order to set the retardations of the LC layer in the transmissive area and the reflective area at $\lambda/2$ and $\lambda/4$, respectively, the cell gap of the reflective area must be changed. The threshold field strength Ec of the lateral-electric-field-mode LCD unit, such as an IPS-mode LCD unit, is generally expressed by $Ec=(\pi/d)\times\sqrt{(K_{22}/\epsilon_0\epsilon)}$. Thus, it is understood that a smaller cell gap requires a higher drive voltage. Reduction of the cell gap in the reflective area inevitably requires a smaller distance between the comb-teeth electrodes, or between the pixel electrode and the common electrode, to strongly drive the LC layer having the smaller gap distance. The LC molecules in the LC layer between the comb-teeth electrodes in the lateral-electric-field LCD unit are rotated by the voltage difference applied between the comb-teeth electrodes, to contribute to the control of the reflectance of the LC layer in the reflective area. However, the LC molecules in the LC layer overlapping the comb-teeth electrodes are not rotated by the voltage difference between the comb-teeth electrodes, and thus do not contribute to the control of the reflectance of the LC layer. The smaller distance between the comb-teeth electrodes increases the ratio of the area that does not contribute to the control of the reflectance to the total reflective area, thereby reducing the reflectance of the LC layer. For achieving a higher reflectance, it is necessary to have a larger reflective area, which reduces the transmissive area by the increased reflective area to thereby reduce the transmittance.

Patent Publication 2 as described before uses a normally-black mode, wherein the bright state is obtained by rotating the LC layer between the comb-teeth electrodes to display a bright state. In this case, the LC molecules in a portion of the LC layer between the comb-teeth electrodes are not rotated, to thereby reduce the brightness during display of a bright state (white), i.e., the white brightness. On the other hand, in the structure of Patent Publication 3, if a dark (black) state is obtained by absence of the applied voltage in the transmissive area, the reflective area assumes a bright state during absence of the applied voltage, whereby the LC layer in the entire reflective area contributes to display of the bright state. However, in this structure, since the LC layer in the reflective area is used to act as a λ/4 film, the cell gap in the reflective area must be smaller, and accordingly, the distance between the comb-teeth, electrodes is reduced, as in the case of Patent Publication 2. Thus, the area of the LC layer contributing to the control of reflectance is substantially similar to that in Patent Publication 2. In Patent Publication 3, when the LC layer is rotated to display a dark state in the reflective area, a portion of the LC layer overlapping the comb-teeth electrodes, as viewed in a direction normal to the substrate surface does not rotate to thereby increase the brightness during display of the dark state, i.e., black brightness, which is undesirable. Thus, although the white brightness is increased, the contrast ratio itself is inferior similarly to Patent Publication 2, due to the increase of the black brightness.

It is an object of the present invention to provide a transflective LCD unit which is capable of reducing the drive voltage applied to the reflective area, and increasing the distance between the pixel electrode and the common electrode in the reflective area.

Means for Solving the Problem

In the transflective LCD of the present invention, since the distance between the pixel electrode and the common electrode in the reflective area can be increased the area of the portion which contributes to the control of reflectance can be increased.

The above and other objects, features and advantages of the present invention will be more apparent from the following description, referring to the accompanying drawings.

BRIEF DESCRIPTION OF THE DRAWINGS

FIGS. 5A and 5B are schematic sectional views showing polarized states of the light during display of a dark state in the reflective area and transmissive area, respectively, by applying the drive signals shown in FIGS. 4A and 4B.

FIG. 11 is a top plan view of a pixel in a step of a fabrication process of the LCD unit, and FIGS. 11A, 1B and 11C are sectional views taken along lines A-A', B-B' and C-C', respectively, in FIG. 11.

FIG. 13 is a top plan view of the pixel in a step subsequent to step of FIG. 12, and FIGS. 13A, 13B and 13C are sectional views taken along lines A-A', B-B' and C-C', respectively, in FIG. 13.

FIG. 14 is a top plan view of the pixel in a step subsequent to step of FIG. 13, and FIGS. 14A, 14B and 13C are sectional views taken along lines A-A', B-B' and C-C', respectively, in FIG. 14.

FIG. 15 is a top plan view of the pixel in a step subsequent to step of FIG. 14, and FIGS. 15A, 15B and 15C are sectional views taken along lines A-A', B-B' and C-C' in FIG. 15.

FIG. 16 is a top plan view of the pixel in a step subsequent to step of FIG. 15, and FIGS. 16A, 16B and 16C are sectional views taken along lines A-A', B-B' and C-C', respectively, in FIG. 16.

FIG. 18 is a top plan view of the pixel in a step subsequent to step of FIG. 17, and FIGS. 18A, 18B and 18C are sectional views taken along lines A-A', B-B' and C-C', respectively, in FIG. 18.

DETAILED DESCRIPTION OF THE INVENTION

Figure 1:
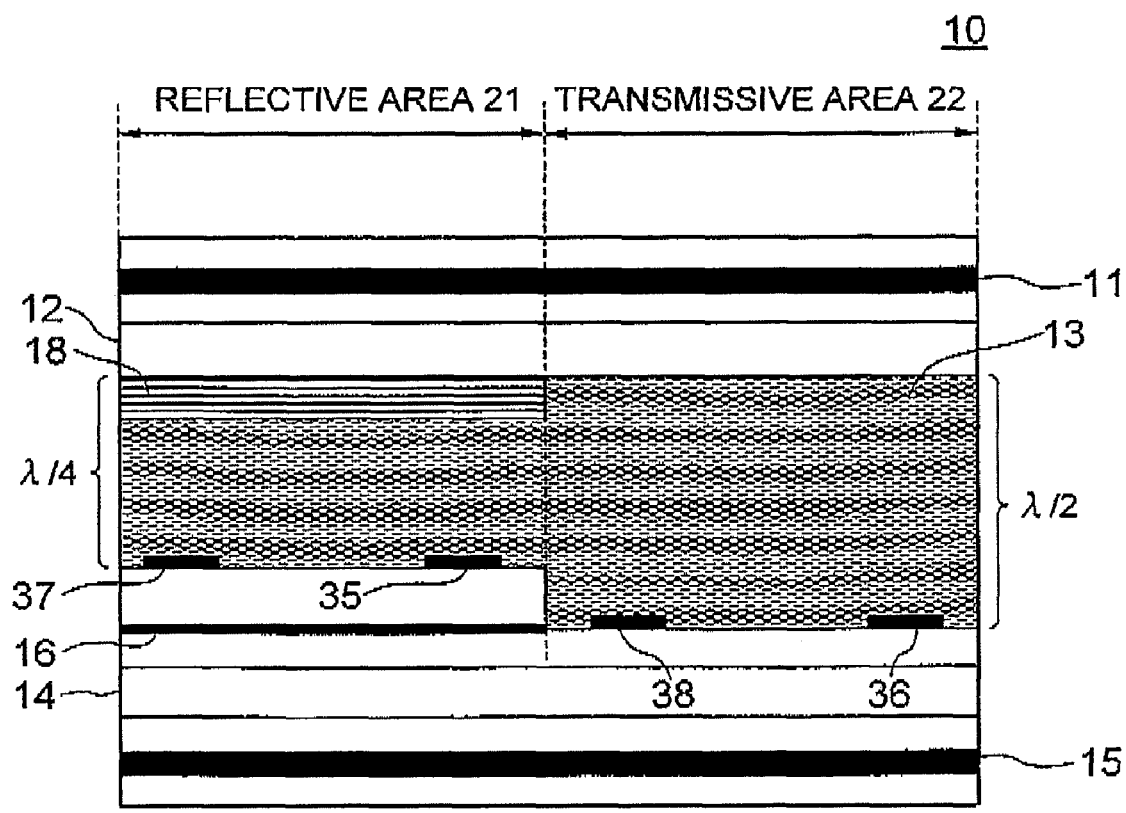
FIG. 1 is a schematic sectional view of a transflective LCD unit according to a first exemplary embodiment of the present invention.

Now, the present invention will be described in detail with reference to accompanying drawings, wherein similar constituent elements are designated by similar reference numerals. FIG. 1 is a schematic sectional view showing a pixel in a transflective LCD unit according to a first exemplary embodiment of the present invention. The LCD unit 10 includes a first polarizing film 11, a counter substrate 12, a retardation film 18, a LC layer 13 homogeneously oriented in the initial orientation direction, a TFT (thin-film-transistor) substrate 14, and a second polarizing film 15, which are arranged consecutively from the front surface of the LCD unit 10. The LCD 10 is configured as a transflective LCD unit including a reflective area 21 and a transmissive area 22 in each pixel area. The LCD unit 10 is used in a multiple-purpose terminal unit such as cellular phone, digital camera, TV, and PDA (personal digital assistant) used in the outdoor, for example. The optical axis of the first polarizing film 11 and the optical axis of the second polarizing film 15 define therebetween an angle of 90 degrees. The orientation direction of the LC layer 13 in the absence of an applied voltage is parallel or perpendicular to the optical axis of the first and second polarizing films 11, 15.

On the TFT substrate 14, a reflection film 16 is provided between the second polarizing film 15 and the LC layer 13 in the reflective area 21 to reflect the light incident through the first polarizing film 11. The reflection film 16 may be any type so long as it reflects the light incident through the first polarizing film 11, and may have preferably a convex-concave surface for achieving scattering of light. The reflective area 21 reflects the light incident from the counter substrate 12 onto the reflection film 16, to use the incident light as the light source for display of an image. The transmissive area 22 uses the light emitted by a backlight source (not shown) disposed on the rear side of the second polarizing film 15, as the light source for display of an image.

In the reflective area 21, there are provided a pixel electrode 35 for receiving a data signal and a common electrode 37 for providing a reference potential, both the electrodes 35, 37 overlying the reflective film 16 formed on the TFT substrate 14. In the transmissive area 22, there are provided a pixel electrode 36 for receiving the data signal and a common electrode 38 for providing a reference potential, both the electrodes 36, 38 being formed on the TFT substrate 14. The pixel electrodes 35, 36 and common electrodes 37, 38 may be configured as a topmost film of the TFT substrate 14, or may be covered by an insulating film. The pixel electrodes 35, 36 and common electrodes 37, 38 may be configured by a metallic film such as Cr film or an indium-tin-oxide (ITO) film. In an alternative, these electrodes may be configured by a conductive film such as Cr/CrO having a reflectance lower than the reflectance of the aluminum film.

The LC layer 13 in the transmissive area 22 has a thickness (referred to as cell gap), which is calculated from the refractive index of the LC material to provide an effective retardation of $\lambda/2$ with respect to the light having a wavelength of $\lambda$=550 nm. It is to be noted that when the LC layer 13 is applied with a voltage, the applied voltage achieves a designed rotation of the LC molecules disposed in the central area of the cell gap, and achieves only a limited rotation of the LC molecules in the vicinity of the substrates. Thus, the retardation of the LC layer 13 calculated from the refractive index should be $(\lambda/2)+\beta$ in order to achieve an effective retardation of $\lambda/2$. Specifically, a calculated retardation of $\Delta nd$=300 nm will provide an effective retardation of:

$$\Delta nd_{eff}=550 \text{ nm}/2=275 \text{ nm}$$

upon presence of the applied voltage The thickness of the LC layer 13 in the transmissive area 21 is designed so that the effective retardation of the LC layer with respect to the light having a wavelength of 550 nm assumes $\lambda/4$.

The LCD unit 10 includes a retardation film 18 in the reflective area 21 between the first polarizing film 11 and the LC layer 13. The retardation of the retardation film 18 is designed so that the effective retardation of the LC layer assumes $\lambda/2$ with respect to the light having a wavelength of $\lambda$=550 nm. The angle $\theta$ between the optical axis of the retardation film 18 and the optical axis of the first polarizing film 11 is set within a range of:

0 degree<$\theta$<22.5 degrees.

More specifically, the optical axis of the retardation film 18 is inclined by an angle of $\theta$ (0 degree<$\theta$<22.5 degrees) with respect to the polarized direction of a linearly-polarized light that passes through the first polarizing film 11 to be incident onto the retardation film 18. This inclined configuration allows the polarized direction of the light incident onto the LC layer 13 from the first polarizing film 11 to be inclined from the optical axis of the first polarizing film 11. Thus, the drive angle needed for rotating (inclining) the LC layer from the initial orientation of the LC layer by 45 degrees upon display of a dark state can be made smaller, to thereby reduce the drive voltage of the LCD unit.

A process for forming the retardation film 18 will be described hereinafter. First, a polyimide alignment layer is formed on the counter substrate 12 by coating, and then subjected to a burning treatment and an alignment treatment. The alignment treatment generally includes a rubbing treatment or optical treatment. Subsequently, a material for the retardation film is formed thereon by coating to have a specific thickness that provides a desired retardation. At this stage, the material for the retardation film is aligned in the alignment direction of the alignment layer. Thereafter, ultraviolet ray is irradiated onto the material in a $N_2$ ambient at the room temperature for polymerization. A heat treatment is then conducted in the $N_2$ ambient for raising the polymerization density of the material, to thereby obtaining the retardation film 18.

Thereafter, a patterning processing is performed to leave the retardation film 18 only in the reflective area 21. Subsequently, an overcoat layer is formed thereon to obtain a desired cell gap in each of the reflective area 21 and transmissive area 22. The retardation film 18 may be formed either outside or inside the substrate, and may be formed by any other process or from any other material so long as the retardation film has a desired retardation and a desired alignment direction. Senarmont method may be used for measuring the retardation of the patterned retardation film that is left locally.

Figure 2:
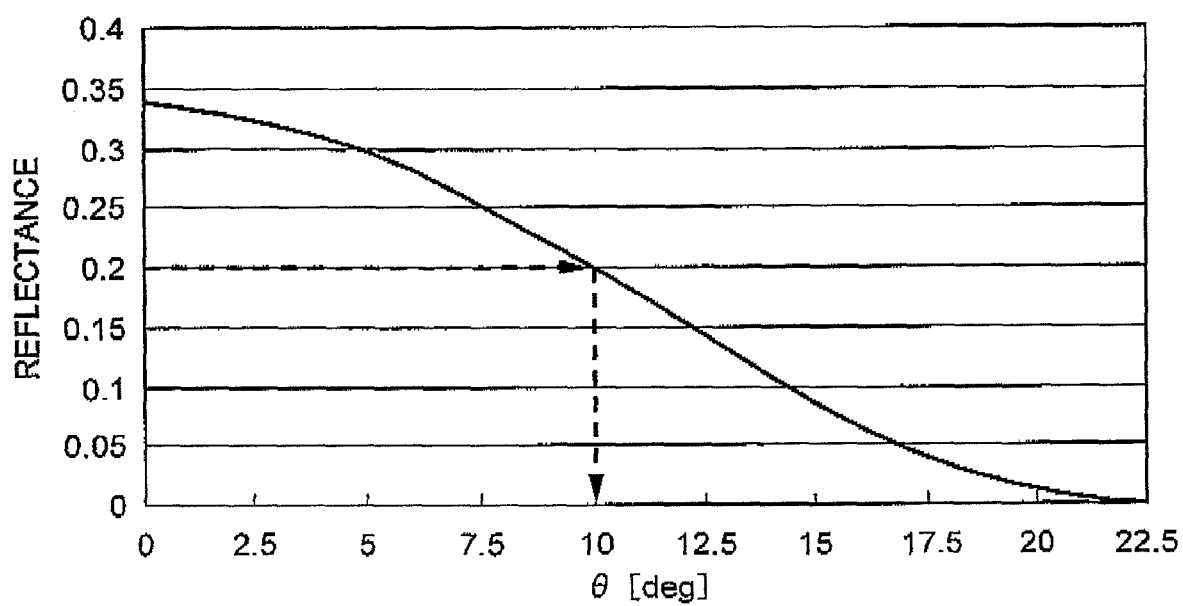
FIG. 2 is a graph showing the relationship between the reflectance and the angle of polarized direction of the linearly-polarized light incident from the first polarizing film with respect to the optical axis of the retardation film.

FIG. 2 shows the relationship between the reflectance of the reflective area and the angle $\theta$ between the optical axis of the retardation film 18 and the polarized direction of the linearly-polarized light incident from the first polarizing film 11. Assuming that the retardation film has a retardation of $\lambda/2$ with respect to the light having a wavelength of 550 nm, the reflectance of the reflective area 21 changes continuously in the range of $\theta$ between 0 degree and 22.5 degrees. It is also assumed here that the orientation of the LC molecules in the LC layer 13 remains at the initial orientation. If $\theta$=0 degree, the linearly-polarized light passed by the first polarizing film 11 passes through the LC layer 13 without changing the polarized state thereof, to be incident onto the reflection film 16. The light incident onto the reflection film 16 is reflected thereby to pass through the LC layer 13 and return to the first polarizing film 11, whereby the reflectance assumes a maximum.

In the related technique described in Patent Publication 1, the reflective area is driven in a normally-black mode, and thus assumes a bright state upon presence of the applied voltage. In the lateral-electric-field mode, since the LC molecules overlapping the comb-teeth electrodes, as viewed in the direction normal to the substrate surface, are not rotated by the applied voltage, the area that contributes to display of the bright state corresponds to the area between the comb-teeth electrodes. Assuming that the ratio of the gap (distance) between the comb-teeth electrodes to the width of the comb-teeth electrodes is 2:1, for example, only a $\frac{2}{3}$ area of the total reflective area contributes to the display of the bright state. Accordingly, the reflectance obtained in the related technique is calculated at $\frac{2}{3}$ of the maximum reflectance, which is around 0.34 as shown by a dotted line in FIG. 2, revealing a value of around 0.22 (=0.34×⅔). Calculation of the range of angle θ that achieves a reflectance higher than the reflectance achieved by the related technique in FIG. 2 provides a range of 0 degree<θ≦10 degrees.

In short, setting the angle θ in the range of 0 degree<θ≦10 degrees provides the reflective area with a reflectance higher than the reflectance achieved by the reflective area of a typical lateral-electric-field LCD unit, such as described in Patent Publication 1, which is driven in a normally-black mode, without increasing the LC drive voltage upon display of a dark state.

A specific rotational angle of the LC molecules that allows the reflective area 21 to display a dark state is expressed by (45−2×θ) degrees. In the view point of reduction of the LC drive voltage, a lower value for the specific rotational angle enables a lower LC drive voltage, that is, a higher value of the angle θ allows a lower LC drive voltage. Accordingly, if it is desired to reduce the drive voltage even at the risk of a lower reflectance, the angle θ may be determined at an arbitrary value in the range of 10 degrees<θ<22.5 degrees. For example, if the output voltage range of the LC driver is limited, priority may be placed on reduction of the drive voltage by setting the angle θ in the range of 10 degrees<θ<22.5 degrees.

Figure 3:
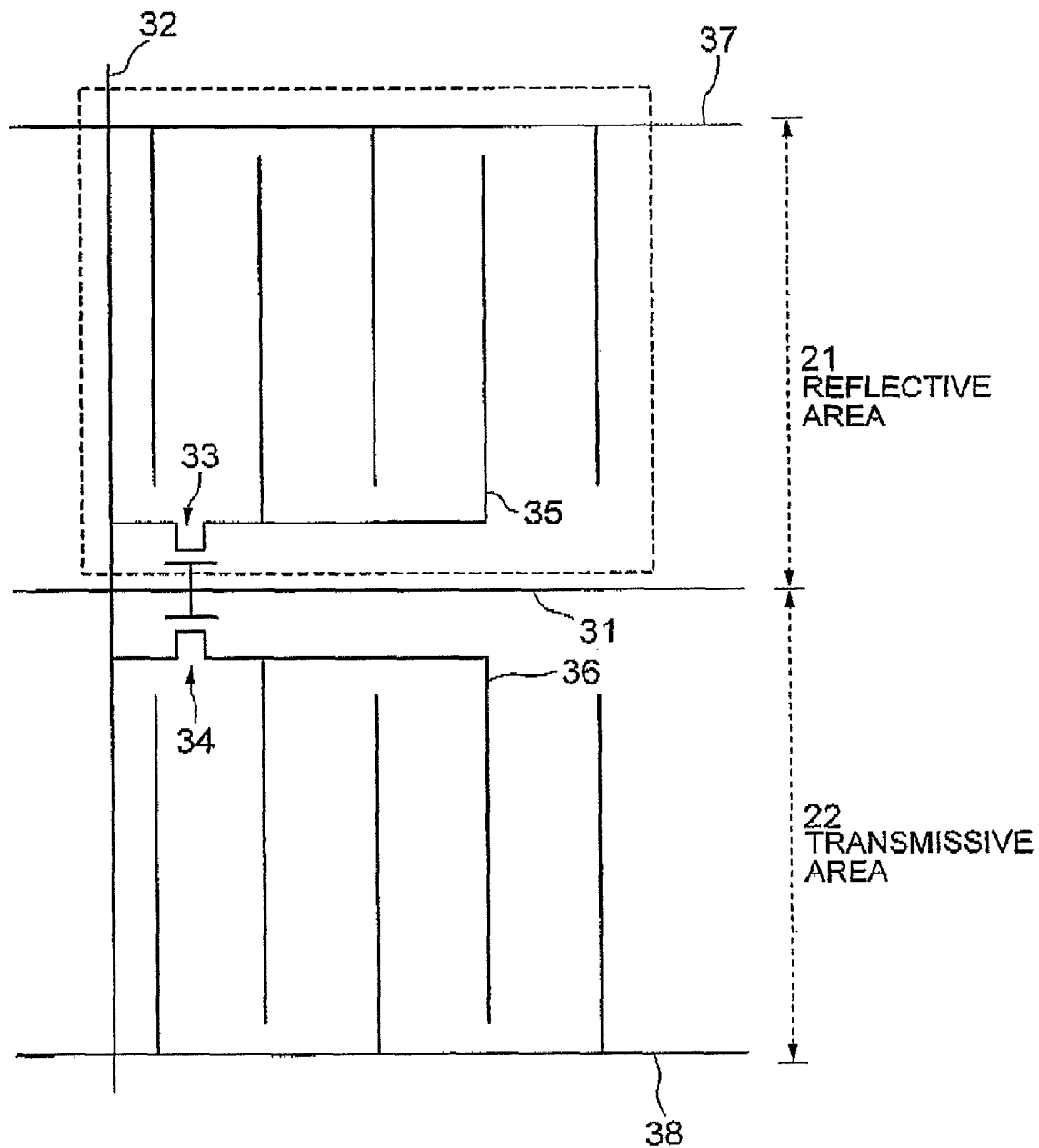
FIG. 3 is a schematic top plan view of a pixel in the transflective LCD unit of the first exemplary embodiment.

FIG. 3 is a schematic top plan view of a pixel on the TFT substrate including TFTs, interconnections and comb-electrodes including pixel electrode and common electrode. A plurality of data lines 32 extend in the column direction of an array of pixels, whereas a plurality of gate lines 31 extend in the row direction thereof TFTs 33 and 34 acting as switching devices are provided in the vicinity of the intersection of a data line 32 and a gate line 31, corresponding to the reflective area 21 and transmissive area 22, respectively. The TFTs 33 and 34 receive a gate signal from the common gate line 31 to connect a data line to pixel electrodes 35 and 36, respectively, of the pixel.

First and second common electrodes 37 and 38 are provided in the reflective area 21 and transmissive area 22, respectively, of the pixel. The first common electrode 37 includes a plurality of branch portions extending parallel to the pixel electrode 35 within the reflective area 21, and a trunk portion coupling together the branch portions of a plurality of reflective areas. The second common electrode 38 includes a plurality of branch portions extending parallel to the pixel electrode 36 within the transmissive area 22, and a trunk portion coupling together the branch portions of a plurality of transmissive areas. Turn-ON of the TFTs 33 and 34 allows the data line 32 to supply a data signal to the pixel electrodes 35 and 36, respectively, for write of the image data therein. In the reflective area 21, the orientation of the LC molecules in the LC layer 13 are controlled by the electric field corresponding to the potential difference between the pixel electrode 35 and the first common electrode 37. Similarly, in the transmissive area 22, the orientation of the LC molecules in the LC layer 13 are controlled by the electric field corresponding to the potential difference between the pixel electrode 36 and the second common electrode 38.

In the above example, the TFT 33 and TFT 34 are connected to the common gate line 31 and common data line 32 for an efficient arrangement of the TFTs on the transparent substrate. However, the TFT 33 and TFT 34 may be connected to respective gate lines and respective data lines. Operation of the LCD unit 10 will be described hereinafter.

Display of a Dark State (Black)

Figure 4A:
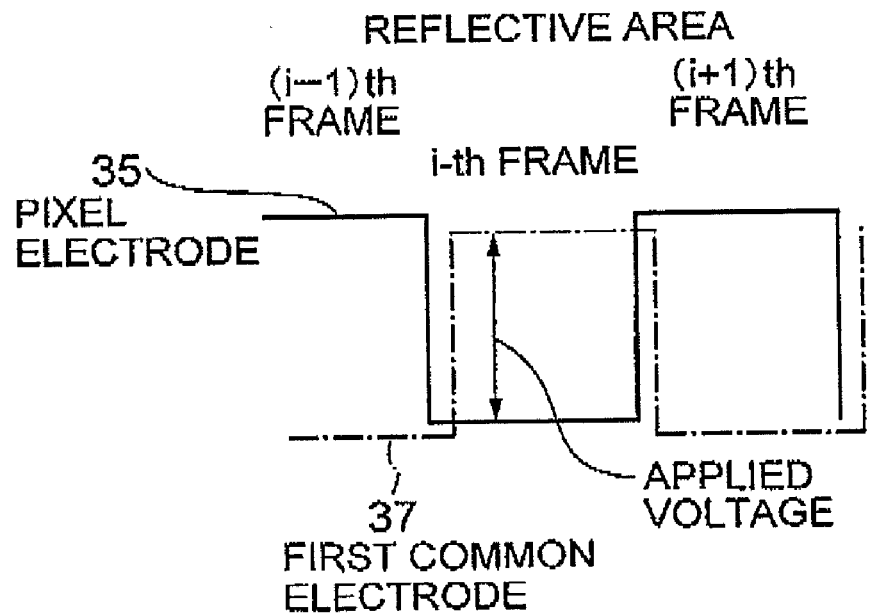
FIGS. 4A and 4B are timing charts showing the waveform of drive signals applied to the reflective area and transmissive area, respectively.
Figure 4B:
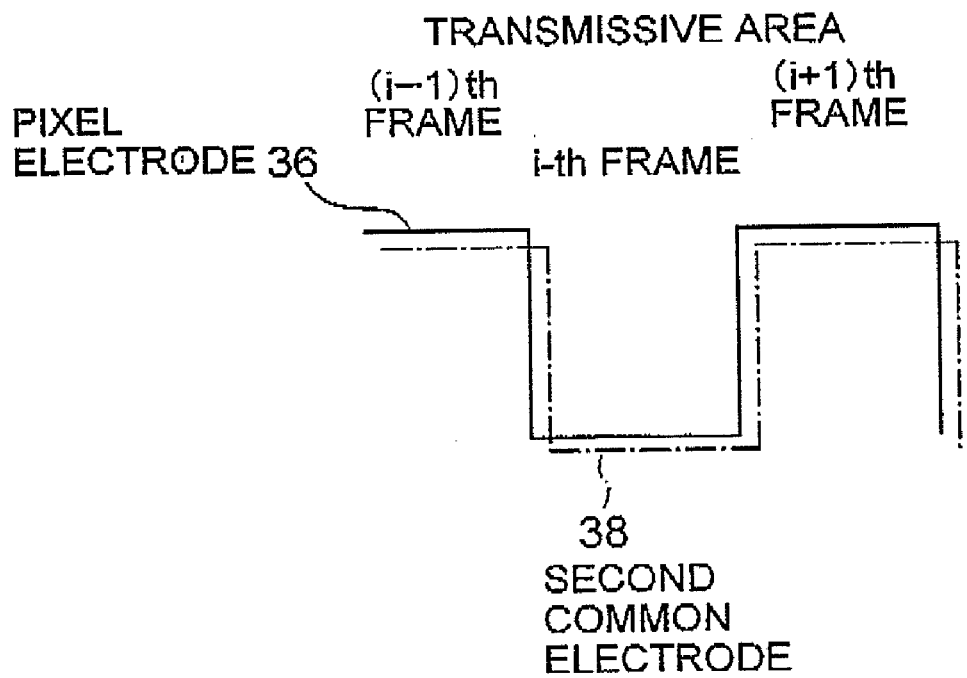

FIG. 4A is a timing chart exemplifying the waveform of a drive signal from (i−1)th frame to (i+1)th frame for the reflective area, whereas FIG. 4B is a timing chart showing the waveform of a drive signal in the same frames for the transmissive area. The signal potential of the first and second common electrodes 37, 38 is reversed between frames as shown in these figures, and also reversed between adjacent rows of pixels due to a gate-line-inversion drive scheme employed therein. Thus, the signal potential of the first and second common electrodes 37, 38 is reversed between, for example, 0V and 5V. In addition, the second common electrode 38 is applied with a signal potential that is an inversion of the signal potential applied to the first common electrode 37.

The data line 32 (FIG. 3) is applied with a pixel signal which assumes an arbitrary potential between 0V and 5V depending on the image to be displayed in the pixel. The pixel signal, which is common to both the reflective area 21 and transmissive area 22 and supplied through the data line, is transferred to the pixel electrodes 35 and 36 by turn-ON of the TFTs 33 and 34. As depicted in FIG. 4A, a pixel signal of 0V is supplied to the pixel electrode 35 and a common signal of 5V is supplied to the first common electrode 37 in the i-th frame. Thus, the potential difference therebetween assumes a maximum of 5V, which is the applied voltage for the LC layer in the reflective area 21 in this i-th frame. On the other hand, in the same i-th frame, the pixel signal of 0V is applied to the pixel electrode 36 and a common signal of 0V is applied to the second common electrode 38, whereby the potential difference therebetween assumes a 0V and thus the LC layer is not driven in the transmissive area 22 in this i-th frame.

FIGS. 5A and 5B show polarized states of the light, when the drive signals of FIGS. 4A and 4B are applied to the reflective area 21 and transmissive area 22, respectively. The notation in these figures and other corresponding figures is such that a blank thick arrow indicates introduction (or emission) of light by the polarizing film, symbol "X" shows interception of light by the polarizing film, a double-pointed solid arrow indicates the polarized direction of a linearly-polarized light, a blank thick bar indicates the orientation of the LC layer 13, a double-dotted solid line indicates the optical axis of the retardation film 18, and R and L encircled indicate clockwise-circularly-polarized light and counterclockwise-circularly-polarized light, respectively. In this example, it is assumed that the optical axis of the first polarizing film 11 is at 90 degrees, the initial orientation of the LC layer 13 in the absence of the applied voltage is at 90 degrees, the optical axis of the retardation film 18 is at 95 degrees whereby θ=5 degrees. It is also assumed that "ne" is the refractive index of the retardation film with respect to the extraordinary light, "no" is the refractive index of the retardation film 18 with respect to the ordinary light, and the birefringence coefficient Δn of the retardation film 18 that is defined by Δn=ne−no is positive, i.e., Δn=ne−no>0, and that Δnd=λ/2. In the reflective area, the distance and the potential difference between the pixel electrode 35 and the first common electrode 37 are arranged so that the orientation of the LC molecules in the LC layer 13 is rotated substantially by (45−2θ=35) degrees upon application of the drive voltage shown in FIG. 4A.

In the reflective area 21, as shown in FIG. 5A, the linearly-polarized light passed by the first polarizing film 11 and laving a polarized direction of 90 degree is passed by the retardation film 18 to have a polarized direction of 100 degrees due to a rotation of the polarization by 10 degrees. The 100-degree-linearly-polarized light is incident onto the LC layer 13, which is rotated in the orientation of the LC molecules by 35 degrees from the initial orientation direction due to the presence of the applied voltage. Thus, the difference between the polarized direction of the incident light at 100 degrees and the orientation of the LC molecules at (90−

35=55) degrees is 45 degrees. The retardation of the LC layer 13 obtained after rotation thereof by 35 degrees from the initial orientation is set at substantially λ/4, whereby the 100-degree-linearly-polarized light incident onto the LC layer 13 is passed thereby to assume a clockwise-circularly-polarized light, which is then incident onto the reflection film 16.

The clockwise-circularly-polarized light incident onto the reflection film 16 is reflected thereby to assume a counter-clockwise-circularly-polarized light, and then incident again onto the LC layer 13. The reflected light passes through the LC layer 13 to assume a linearly-polarized light having a polarization of 190 degrees (=10 degrees) which is deviated from the polarized direction of the linearly-polarized light that is incident onto the LC layer 13 through the first polarizing film 11 by 90 degrees, and is incident onto the retardation film 18. The angle between the polarized direction of this incident light and the optical axis (5 degrees) of the retardation film 18 is 85 degrees, whereby the linearly-polarized light passed by the retardation film 18 has a polarized direction of 180 degrees (i.e., 0 degree), which is parallel to the light-absorbing axis of the first polarizing film 11. Thus, the linearly-polarized light incident onto the first polarizing film 11 cannot pass through the same, as shown by "X" in FIG. 5A, whereby the reflective area 21 displays a dark state.

In the transmissive area 22, as shown in FIG. 5B, the linearly-polarized light passed by the second polarizing film 15 has a polarized direction at 90 degrees, and incident onto the LC layer 13. The linearly-polarized light is not changed in the polarized state thereof by the LC layer 13, incident onto the first polarizing film 11, and stopped by the first polarizing film 11 as shown by "X" in FIG. 5B. Thus, the transmissive area displays a dark state.

In the above example, it is assumed that the retardation of the retardation film 18 is λ/2, retardation of the LC layer 13 is λ/4, and the angle θ between the optical axis of the retardation film 18 and the initial orientation of the LC layer 13 is 5 degrees. However, the combination of the retardation of the retardation film 18, retardation of the LC layer 13 and angle arrangement may be such that the applied voltage that provides a dark state in the reflective area 21 allows the light incident onto the reflection film 16 to assume a circularly-polarized light. This configuration may be obtained by adjustment of these parameters in accordance with the maximum output voltage of the LC driver and the cell gap of the LC layer 13. For example, the angle θ between the optical axis of the retardation film 18 and the initial orientation of the LC layer 13 may be set larger than 5 degrees. In this case, since the angle between the polarized direction of the light incident onto the LC layer 13 from the first polarizing film 11 and the initial orientation of the LC layer 13 increases, the rotational angle of the LC layer needed for display of a dark state can be reduced further and thus the drive voltage can be lowered.

Figure 6:
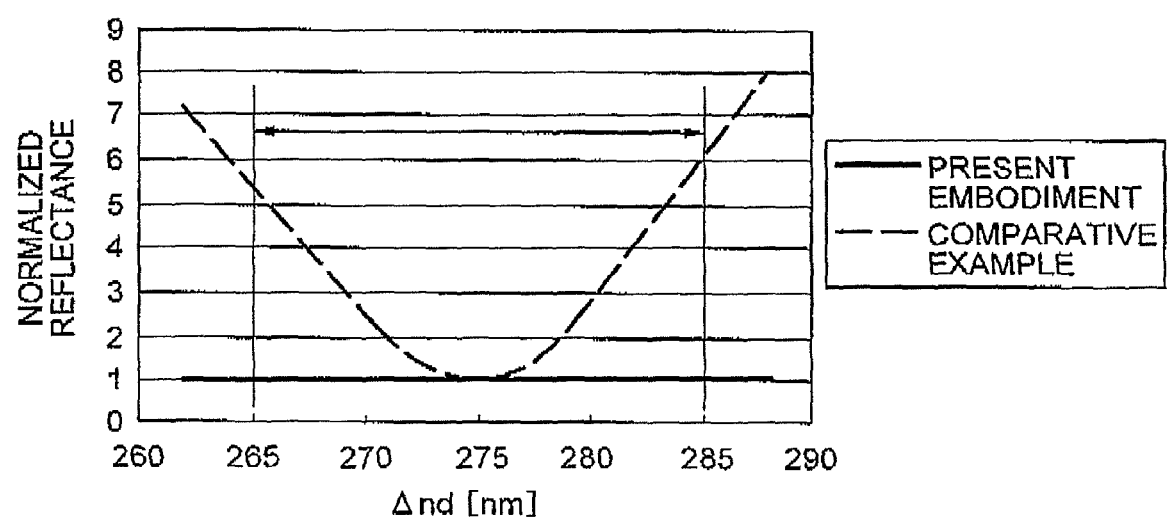
FIG. 6 is a graph showing the relationship between normalized reflectance and the retardation of the retardation film.

Considering that the thickness of the retardation film 18 has a range of variation, the retardation of the retardation film 18 has a range of variation, which causes deviation from a desired retardation FIG. 6 shows the relationship obtained in the present exemplary embodiment between the normalized reflectance and the retardation of the retardation film 18 in a solid line, which is substantially flat. FIG. 6 also shows, as a comparative example, the relationship obtained in the related technique as described before between the normalized reflectance and the retardation in the dotted line. In this figure, the horizontal arrow between two vertical lines indicates the range of variation in the Δnd of the retardation film for the case that a designed Δn is 0.1 and a range of variation in the thickness of the retardation 18 is ±0.1 μm. The normalized reflectance varies from 1 to around 5.5 in the related technique.

In the related technique, the reflectance considerably changes depending on the retardation of the retardation film. On the contrary, the reflectance obtained in the present exemplary embodiment substantially stays at a constant at any retardation. The present exemplary embodiment has an advantage over the related technique in consideration that a retardation film, such as an in-cell retardation film, is often formed by a LC-polymer coat. The LC-polymer coat generally has a larger change of retardation due to a wider range of variation in the thickness caused by the manufacturing process compared to the film-type retardation film.

The retardation film 18 may be configured by a retardation film having a positive retardation or a negative retardation in the birefringence. If a retardation film having a positive retardation is used for the retardation film 18, the wavelength dependencies of both the retardation film and the LC layer are added together because the retardation of the LC layer 13 has also a positive retardation. In this case, if the birefringence of the retardation film 18 is constant with respect to RGB lights, a color shift or coloring of the light will be intensified. In order to avoid such a coloring, RGB areas in each of the pixels preferably have different retardations, such as:

$$\Delta nd_R(550) > \Delta nd_G(550) > \Delta nd_B(550).$$

where $\Delta nd_R(550)$, $\Delta nd_G(550)$ and $\Delta nd_B(550)$ are retardations of the LC layer in R, G and B color areas, respectively, of a pixel with respect to a light having a wavelength of 550 nm. For example, a configuration may be employed wherein $\Delta nd_R(550)$, $\Delta nd_G(550)$ and $\Delta nd_B(550)$ in a pixel are larger than λ/2, equal to λ/2 and smaller than λ/2, respectively. This enlarges the bandwidth of the LCD unit.

If a retardation film having a negative retardation in the birefringence is used as the retardation film 18 in the above arrangement of the optical axes, such a retardation film changes polarization of the light in a direction opposite to the direction of the change of polarization in the LC layer 13. This allows cancellation of the coloring caused by the wavelength dispersion between the retardation film 18 and the LC layer 13, thereby achieving enlargement of the bandwidth. The condition of achieving a broadband λ/4 film is such that:

$$\{|(\Delta n_B(450)/450) - (\Delta n_G(550)/550)|\}_{retardation\,film} \times d_{COM}\ \text{is not larger than}\ \{(\Delta n_B(450)/450) - (\Delta n_G(550)/550)\}_{LC\,layer} \times d_{LC}$$

in the case of retardation of the retardation film 18 being λ/2 and retardation of the LC layer 13 being λ/4. In the above notation, $\{A\}_{retardation\,film}$ means a value A calculated for the retardation film, $\{B\}_{retardation\,film}$ means a value, B calculated for the LC layer, and $d_{COM}$ and $d_{LC}$ are thicknesses of the retardation film and LC layer, respectively.

On the other hand, in the transmissive area 22, an electric field is not generated between the pixel electrode 36 and the second common electrode 38 due to the drive signal shown in FIG. 4B. Thus, the LC molecules in the LC layer 13 stay at the initial orientation. More specifically, the LC molecules in the LC layer 13 in the transmissive area 22 stay at 90 degrees, as shown in FIG. 5A. For this reason, in the transmissive area 22, the 0-degree-linearly-polarized light, which is incident onto the LC layer 13 from the second polarizing film 15, maintains the polarized state thereof after passing through the LC layer 13, and is incident onto the first polarizing film 11. In this case, since the polarized direction of the linearly-polarized light passed by the LC layer 13 is parallel to the optical absorption axis of the first polarizing film 11, the linearly-polarized light cannot pass through the first polarizing film 11, whereby the transmissive area 22 assumes a dark state.

In the LCD unit 10, the optical axis of the first polarizing film 11 is perpendicular to the optical axis of the second polarizing film 15, and the optical axes of the first polarizing film 11 and second polarizing film 15 are parallel or perpendicular to the initial orientation of the LC layer 13 (i.e., in the absence of the applied voltage). In the related technique described in Patent Publication 2, even if the light finally incident onto the first polarizing film 15 is designed to be a linearly-polarized light, the light that was passed by the first polarizing film from outside the LCD unit changes the polarization thereof after passing through the retardation film or LC layer from the linear polarization to a circular polarization and vice versa, in an ideal condition, due to the inclined angle of the optical axis of the retardation film or orientation of the LC layer with respect to the optical axis of the second polarization film. In a practical condition, due to the range of variation in the retardation of the retardation film or the range of deviation in the angle thereof with respect to the second optical axis, the circular polarization is replaced by an elliptical polarization, whereby a perfect or ideal linear polarization is not obtained after the change of polarization thereof from the elliptical polarization. The imperfect linear polarization of the light incident onto the first polarizing film incurs degradation of the contrast ratio.

On the other hand, in the arrangement of the present exemplary embodiment, since the light passed by the second polarizing film 15 upon display of a dark state is incident onto the first polarizing film 11 without changing the polarization state thereof, it is possible to perfectly align the polarized direction of the linearly-polarized light incident onto the first polarizing film 11 after passing through the LC layer 13 to the optical absorption axis of the first polarizing film 11. This means improvement of the contrast ratio in the present exemplary embodiment over the related technique.

As described heretofore, the drive signal applied to the second common electrode 38 is an inversion of the drive signal applied to the first common electrode 37. This configuration allows the same pixel signal to be applied to the pixel electrode 35 in the reflective area 21 and pixel electrode 36 in the transmissive area 22 while changing the initial orientation of the LC molecules of the LC layer 13 only in the reflective area 21. Thus, when the reflective area 21 displays a dark state, the transmissive area also displays a dark state to obtain the dark sate both in the areas, without changing the pixel signal between the reflective area 21 and the transmissive area 22.

Display of a Bright State (White)

Figure 7A:
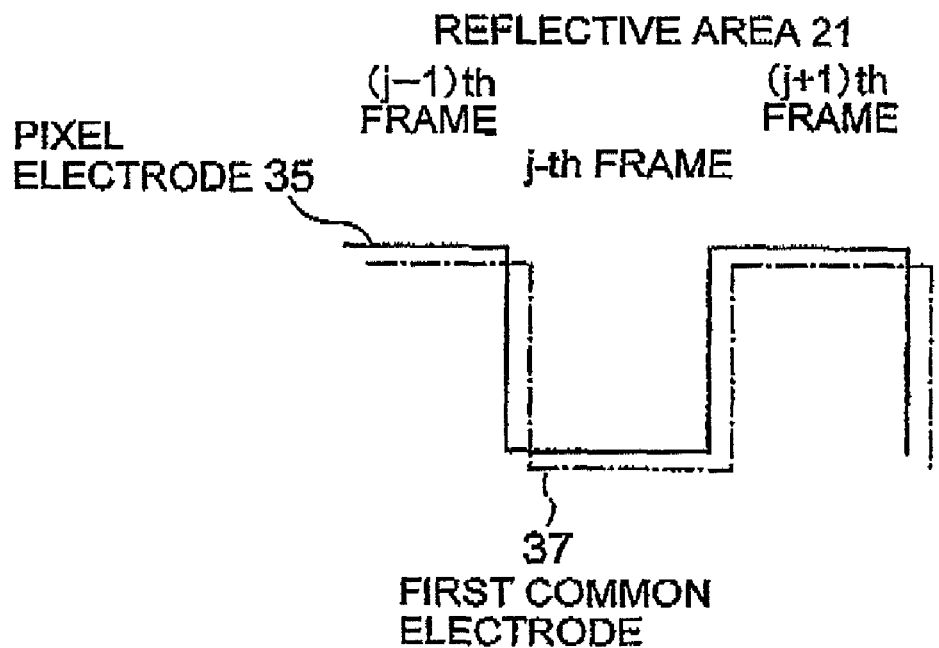
FIGS. 7A and 7B are timing charts showing a waveform of the drive signals applied to the reflective area and transmissive area, respectively.
Figure 7B:
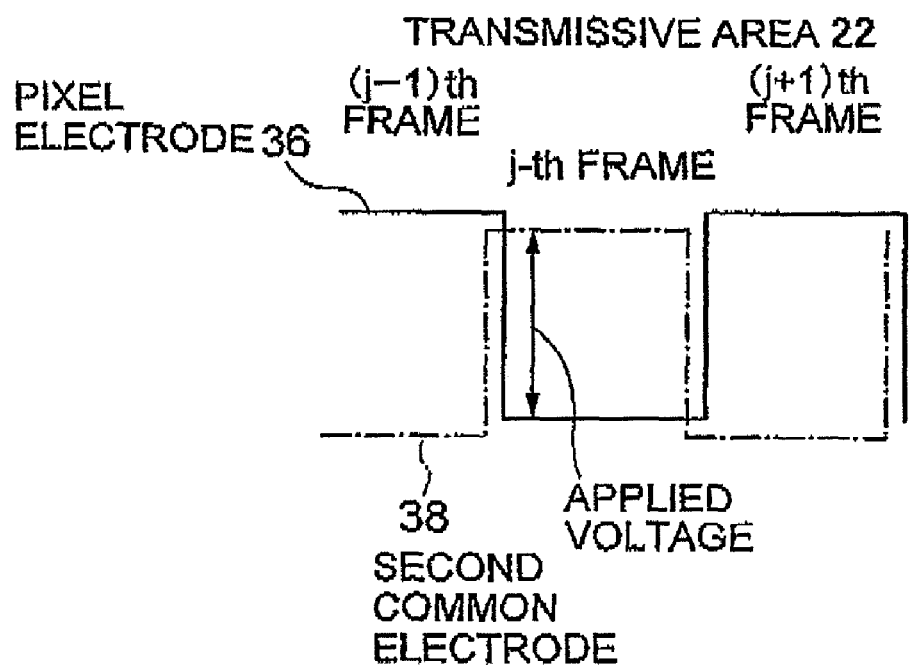
Figure 8A:
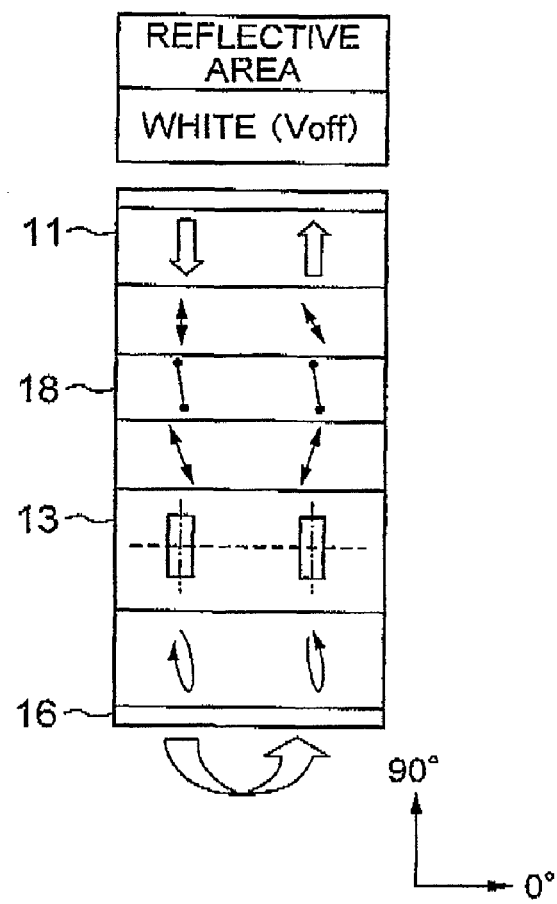
FIGS. 8A and 8B are schematic sectional views showing polarized states of the light during display of a bright state in the reflective area and transmissive area, respectively, by applying drive signals shown in FIGS. 7A and 7B.
Figure 8B:
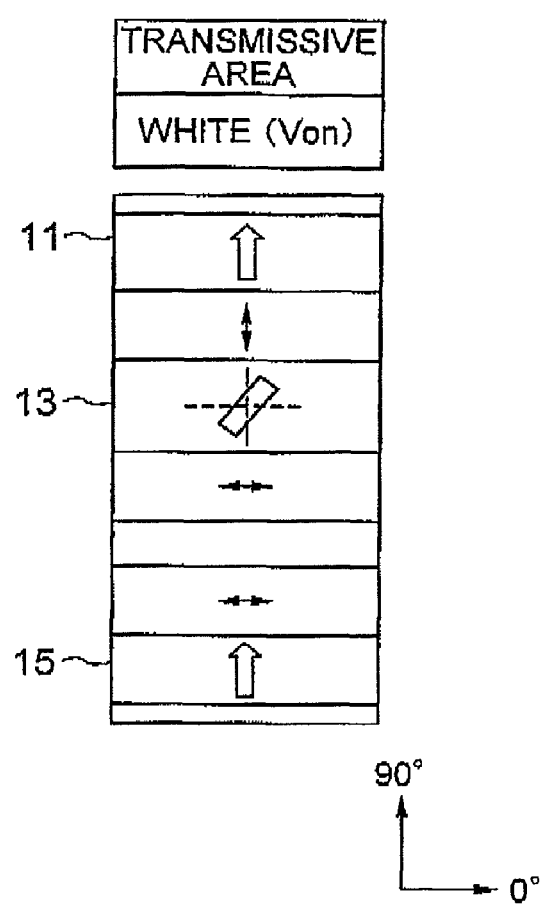

FIGS. 7A and 7B are timing chars showing drive signals for the electrodes in the reflective area 21 and transmissive area 22, respectively, upon display of a bright state in (j−1)th frame to (j+1)th frame. FIGS. 8A and 8B are schematic sectional views showing the polarization of the light in the reflective area 21 and transmissive area 22, respectively, upon application of the drive signals shown in FIGS. 4A and 4B. In the state of the reflective area 21 applied with the drive signal shown in FIG. 7A, there is no electric field generated between the pixel electrode 35 and the first common electrode 37, whereby the LC molecules in the LC layer 13 stay at the initial orientation, i.e., at 90 degrees. Thus, as shown in FIG. 8A, the 90-degree-linearly-polarized light passed by the first polarizing film 11 passes through the retardation film 18, to thereby assume a 100-degree linearly-polarized light, which is incident onto the LC layer 13.

In the LC layer 13, the angle between the polarized direction of the incident light and the orientation of the LC molecules is 10 degrees, whereby the polarized direction of the light passing through the LC layer 13 is continuously changed to assume a clockwise-elliptically-polarized light, which is incident onto the reflection film 16. The reflection film 16 reflects the clockwise-elliptically-polarized light to turn the same into a counterclockwise-elliptically-polarized light, which is again incident onto the LC layer 13. The reflected light passes through the LC layer 13 while being continuously changed in the polarized state thereof, then passes through the retardation film 18, and is incident onto the first polarizing film 11. In the return path of the light, the polarization of the light is changed in an opposite direction by both the LC layer 13 and retardation film 18, whereby a 110-degree-linearly-polarized light is incident onto the first polarizing film 11. The first polarizing film 11, which has a light transmission axis of 90 degrees, passes therethrough most part of the reflected linearly-polarized light, thereby allowing the reflective area 21 to display a bright state.

On the other hand, in the transmissive area 22 applied with the drive signal shown in FIG. 7B, the orientation of the LC molecules of the LC layer 13 in the transmissive area 22 is rotated by around 45 degrees due to the electric field applied between the pixel electrode 36 and the second common electrode 38. Thus, the 0-degree-linearly-polarized light passed by the second polarizing film 15 passes through the LC layer 13, to assume a 90-degree-linearly-polarized light, which is incident onto the first polarizing film 11. Since the optical transmission axis of the first polarizing film 11 is at 90 degree, this linearly-polarized light passes through the first polarizing film 11, whereby the transmissive area 22 displays a bright state.

As described heretofore, the configuration wherein the drive signal applied to the first common electrode 37 is an inversion of the drive signal applied to the second common electrode 38 allows the reflective area to display a bright state when the transmissive area 22 displays a bright state. More specifically, the drive signals shown in FIGS. 7A and 7B allow both the areas to display a bright state at the same time. It is to be noted that if the drive voltage of the reflective area 21 for display of a dark state does not match the drive voltage of the transmissive area 22 for display of a bright state, it is sufficient to adjust the width of the comb-teeth electrodes etc., and thereby match the V-T (voltage-transmittance) characteristics and V-R (voltage-reflectance) characteristics of the LC layer 13 between both the areas 21, 22.

As understood from FIG. 3, the pixel electrode 35 in the reflective area 21 and pixel electrode 36 in the transmissive area 22 are connected to the respective TFTs 33 and 34, which are connected to the same gate line 31 and the same data line 32 however. In this configuration, although the same data signal is written into the pixel electrode 35 in the reflective area and pixel electrode 36 in the transmissive area, the TFTs 33 and 34 are provided for the reflective area 21 and transmissive area 22, respectively. The reason will be described hereinafter. The TFTs 33 and 34 are turned OFF after the same data signal is written from the data line 32 into both the pixel electrodes 35, 36. This allows both the pixel electrodes 35, 36 to be isolated from each other, and thus to have different potential fluctuations depending on the potential of the associated common electrodes 37, 38.

Figure 9A:
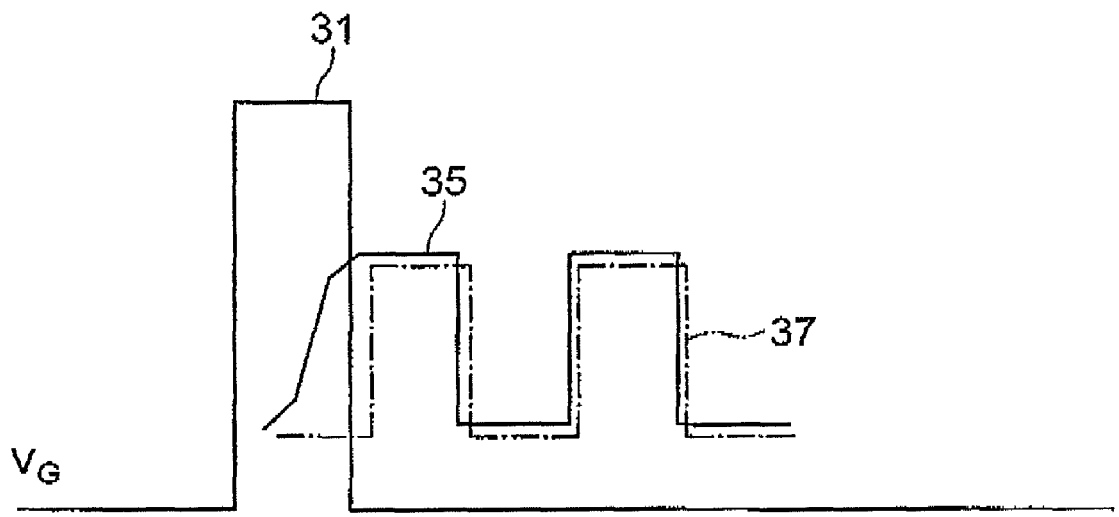
FIGS. 9A and 9B are timing charts showing the potential change after applying drive signals to the reflective area and transmissive area, respectively.
Figure 9B:
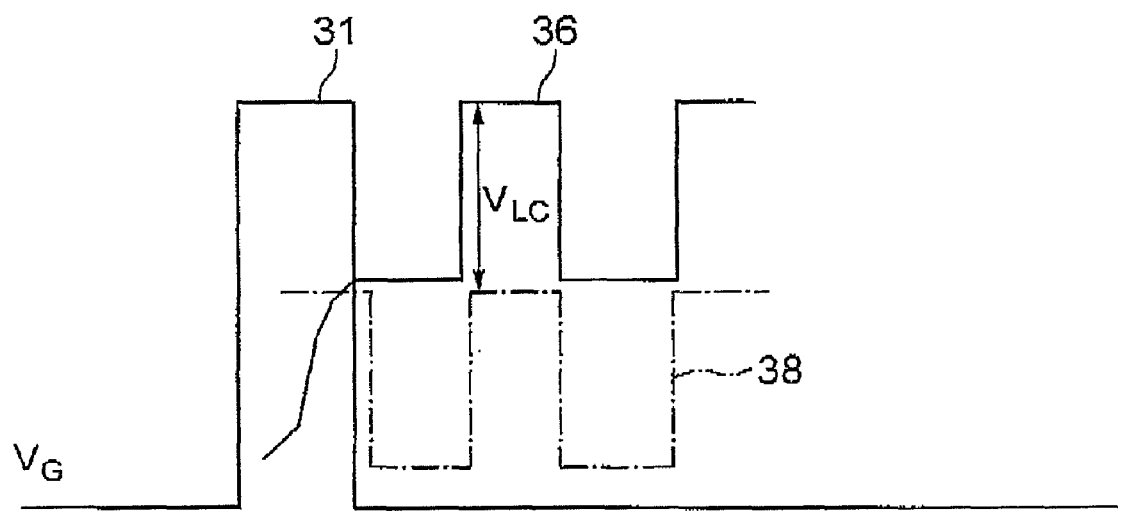

FIGS. 9A and 9B show the potential fluctuation of the pixel electrode 35 and 36, respectively, after supplying the data signal thereto in the (i−1)th frame shown in FIGS. 4A and 4B. In the gate-line-inversion drive scheme, for example; since the polarity of the drive signal is inverted between rows of pixels, the potential of both the common electrodes 37 and 38 continues inversion of the polarity in accordance with the polarity inversion of each row in a time interval between the time instant when the gate line 31 is applied with a gate pulse in a frame and the time instant when the same gate line 31 is applied with another gate pulse in the next frame. In this time interval, the pixel electrodes 35 and 37 are isolated from the data line 31 to stay in a floating state, due to turn-OFF of the TFTs 33, 34.

The potential of the pixel electrodes 35 and 37 fluctuates due to the coupling capacitor between the pixel electrode 35 and the first common electrode 37 and between the pixel electrode 36 and the second common electrode 38 while maintaining the potential difference therebetween, as shown in FIGS. 9A and 9B. The potential fluctuations of the pixel electrodes 35 and 37 shown in FIGS. 9A and 9B after application of the drive signal are different from each other, whereby the reflective area 21 and transmissive area 22 require different TFTs 33 and 34 for the respective pixel electrodes 35 and 37.

In the present exemplary embodiment, as described above, the common electrode is divided into the first common electrode 37 and second common electrode 38 corresponding to the reflective area 21 and transmissive area 22, respectively. The first common electrode 37 and second common electrode 38 are supplied with common-electrode signals having opposite polarities and thus having therebetween opposite potential relationships with respect to the potential of the same data signal so that the magnitudes of the electric field applied to the LC layer in both the areas are opposite from each other. That is, a bright state corresponds to a lower electric field in the reflective area 21 and corresponds to a higher electric field in the transmissive area 22, whereas a dark state corresponds to a higher electric field in the reflective area 21 and corresponds to a lower electric field in the transmissive area 22. This configuration allows both the areas 21 and 22 to display the same image without supplying different pixel signals to the pixel electrodes 35 and 37, and solves the problem known as a white-black inversion problem as encountered in the typical IPS-mode transflective LCD unit.

In the configuration of the present exemplary embodiment, the orientation of LC layer in the transmissive area 22 upon display of a dark state is parallel or normal to the polarized direction of the light incident onto the LC layer. This configuration reduces the influence by the wavelength dispersion of the retardation film and LC layer in the transmissive area 22 upon display of a dark state, to prevent leakage of light upon display of the dark state. The relationship between the optical axis of the first and second polarizing films and the orientation of the LC layer 13 in the transmissive area 22 is similar to that of the typical IPS-mode transmissive LCD unit. Thus, the contrast ratio of the transmissive area 22 is equivalent to that of the typical IPS-mode transmissive LCD unit. The drive signal of the reflective area 21, which is inverted in the polarity from the drive signal of the transmissive area 21, allows the initial orientation of the LC layer in the absence of the applied voltage to display a bright state. The initial orientation of the LC layer is uniform in the entire reflective area, whereby the entire reflective area 21 can be used for display of a bright state to thereby achieve a higher reflectance in the reflective area.

In a typical TN-mode LCD unit, the reflective film is configured by a pixel electrode having a reflection function and applied with a pixel signal having a gray-scale level for driving the LC layer depending on the image. On the other hand, in the IPS-mode LCD unit, the LC layer is driven by the electric field applied between the pixel electrode 35 and the first common electrode 37 in the reflective area. Thus, the potential of the reflective film 16 may be arbitrarily designed.

An influence by the potential of the reflective film 16 on the image of the LCD unit will be described hereinafter.

Figure 10A:
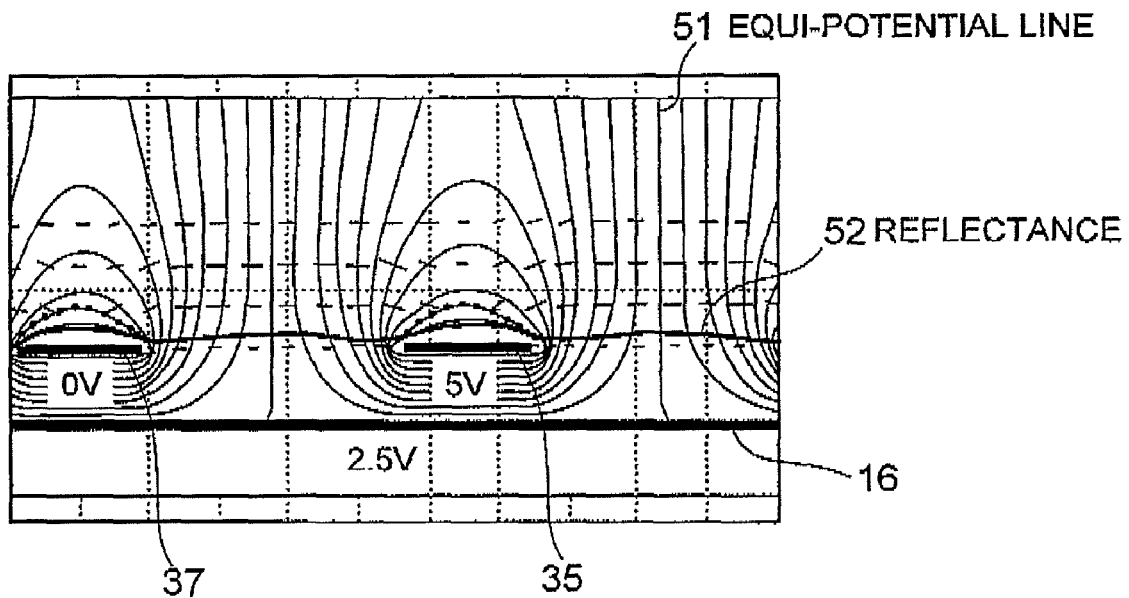
FIGS. 10A and 10B are sectional views showing the equipotential diagrams during application of drive signals.
Figure 10B:
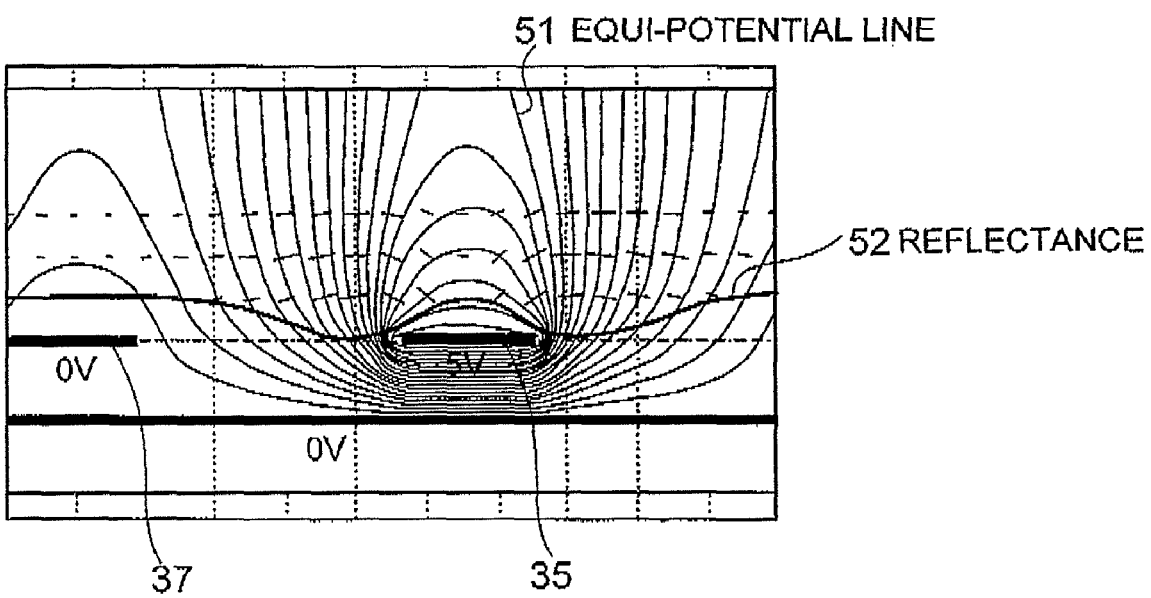

FIGS. 10A and 10B show an electric-field distribution and a transmittance distribution obtained in a simulation upon display of a dark state in the reflective area 21. FIG. 10A shows the electric-field distribution 51 and transmittance distribution 52 when the pixel electrode 35 is applied with 5V and the first common electrode 37 is applied with 0V in the case that the reflective film 16 is maintained at a median potential, i.e., 2.5V. FIG. 10B shows the electric-field distribution 51 and transmittance distribution 52 when the pixel electrode 35 is applied with 5V and the first common electrode 37 is applied with 0V in the case that the reflective film 16 is maintained at 0V or equipotential with the common electrode 37.

In the case of FIG. 10A wherein potential of the reflection film 16 is maintained at the median potential between the pixel electrode 35 and the common electrode 37, significant leakage of light occurs on the pixel electrode 35 and common electrode 37 and thus raises the optical transmittance thereon. However, the leakage of light is suppressed in the gap between the pixel electrode 35 and the common electrode 37, thereby suppressing the rise of the reflectance in the gap, as shown in FIG. 10A. On the other hand, if the reflection film 16 is maintained equipotential with the pixel electrode 35, as shown in FIG. 10B, the leakage of light increases in the vicinity of the common electrode 37 and raises the optical transmittance in this vicinity. This is considered due to the fact that a strong electric field occurring between the pixel electrode 35 and the common electrode 37 directs the electric field (electric line of force), which typically converges between the pixel electrode 35 and the common electrode 37, toward the reflective film 16, thereby causing insufficient drive of the LC molecules in the vicinity of the common electrode 37.

From the result of the above simulation, it is preferable that the reflection film 16 be maintained at the median potential between the potential of the pixel electrode 35 and the potential of the common electrode 37. The potential of the reflection film 16 may be directly controlled by supplying the desired potential to the reflection film 16, or indirectly controlled by using a coupling capacitance while leaving the same in a floating state. If a floating technique, for example, is to be employed for obtaining the median potential, an interconnection supplied with the potential of the pixel electrode 35 and another intersection supplied with the potential of the common electrode 37 are provided below the reflective film 16 so that the area of the interconnection opposing the reflection film 16 is equal to the area of the another interconnection opposing the reflection film 16.

A process for manufacturing the TFT substrate in the LCD unit 10 shown in FIG. 1 will be described hereinafter, with reference to FIGS. 11 to 18 showing top plan views of the pixel at respective steps of the process and associated sectional views taken in the respective top plan views. A gate line 31, a first common-electrode line 37a, and a second common-electrode line 38a are formed for each row of the pixels on a transparent substrate by deposition and patterning of a conductive material, as shown in FIG. 11 and associated figures (FIGS. 11A, 11B and 11C). FIG. 11A shows a sectional view taken along line A-A' in the reflective area 21. FIG. 11B shows a sectional view taken along line B-B' in the transmissive area 22, and FIG. 11C shows a sectional view taken along line C-C' in the vicinity of the boundary between the reflective area 21 and the transmissive area 22. In the reflective area 21, the first common-electrode line 37a protrudes in the display area so as to provide the median potential to the reflection film to be formed later. Subsequently, the gate lines 31, first common-electrode line 37a, and second common-electrode line 38a are covered by an insulation film.

Figure 12D:
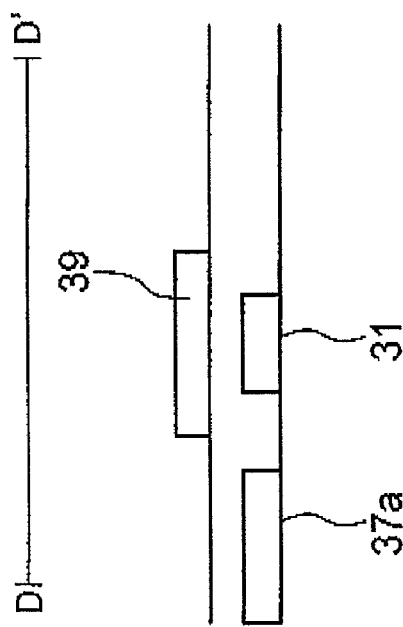
FIG. 12D is a sectional view taken along line D-D' in FIG. 12.
Figure 12:
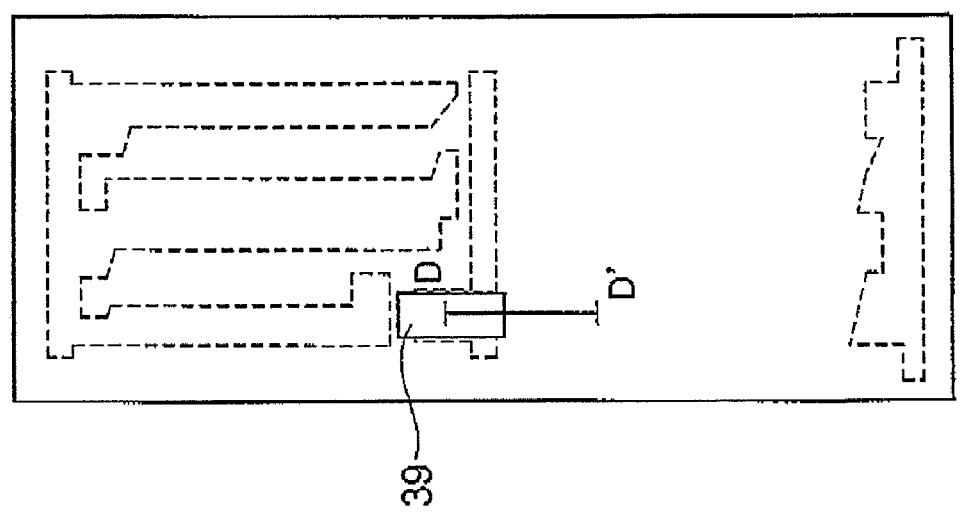
FIG. 12 is a top plan view of the pixel in a step subsequent to step of FIG. 11.

Thereafter, as shown in FIG. 12, an island semiconductor layer 39 for forming thereon a TFT 33 is formed in each pixel by deposition and patterning of a silicon film. The island semiconductor layer 39 overlaps a gate line 31 (or gate electrode) as viewed in the direction normal to the substrate surface. Subsequently, as shown in FIG. 13, a pixel-electrode line 35a connected to the source/drain path of the TFT 33 and a pixel-electrode line 36a connected to the source/drain path of the TFT 34 are formed by deposition and patterning.

FIGS. 13A, 13B and 13C show the sectional views at the stage of FIG. 13, similarly to FIGS. 11A, 11B and 11C, respectively. In the reflective area 21, the first common-electrode line 37a is formed between two adjacent pixel-electrode lines 35a. In each pixel on the TFT substrate, the area of the first common-electrode line 37a is substantially equal to the area of the first pixel-electrode line 35a, so as to provide the median potential to the reflection film 16 that is formed later. The pixel-electrode line 35a and pixel-electrode line 36a are then covered by an insulation film.

Thereafter, an overcoat layer 40 having a concave-convex surface is formed thereon, as shown in FIG. 14 and associated figures. An aluminum film is then formed on the overcoat layer 40 to have a pattern shown in FIG. 15. As shown in FIG. 15A, a portion of the aluminum layer right under the pixel electrode 35 and first common electrode 37 to be formed layer is removed in the reflective area 21 by patterning to configure the reflection film 16 in the reflective area 21.

Figure 17E:
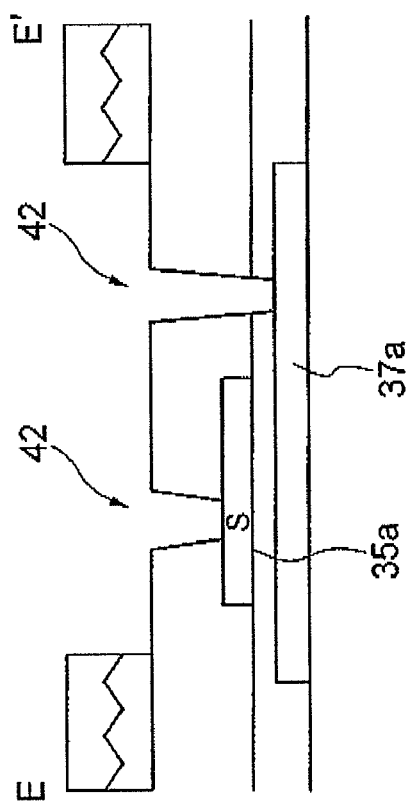
FIG. 17E is a sectional view taken along line E-E' in FIG. 17.
Figure 17:
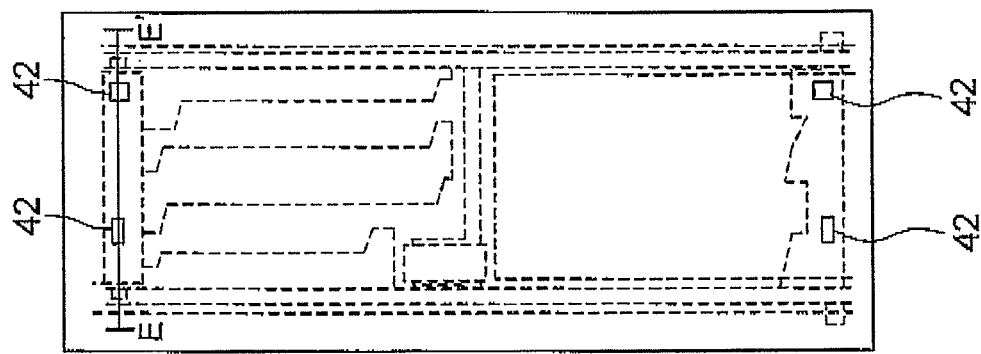
FIG. 17 is a top plan view of the pixel in a step subsequent to step of FIG. 16.

Thereafter, a flat overcoat layer 41 is formed to configure the pattern as shown in FIG. 16. The surface of the flat overcoat layer 41 has a step on the boundary between the reflective area 21 and the transmissive area 22, to adjust the cell gaps for the respective areas 21, 22. Subsequently, as shown in FIGS. 17 and 17E, contact holes 42 are formed in the insulation film covering the pixel-electrode lines 35a and 36a, first common-electrode line 37a and second common-electrode line 38a, to expose therethrough a portion of the pixel-electrode lines 35a and 36a, first common-electrode line 37a, and second common-electrode line 38a. FIG. 17E shows the structure in a peripheral portion of the reflective area 21.

The pixel electrodes 35 and 36, first common electrode 37, and second common electrode 38 are then formed on the flat overcoat layer 41 having therein contact holes 42, to obtain the structure shown in FIG. 18, and associated figures. These electrodes 35, 36, 37, 38 are connected to the corresponding underlying electrode lines 35a, 36a, 37a, 38a via the contact holes 42. Thus, the TFT substrate 14 for use in the transflective LCD unit 10 of FIG. 1 can be obtained.

The present exemplary embodiment achieves improvement of the contrast ratio and viewing angle characteristic in the transmissive area 22 while employing the configuration of the transmissive area 22 which is similar to the configuration of a typical transmissive IPS-mode LCD unit. For achieving such an improvement, a configuration is employed wherein the drive signal for the transmissive area 22 is an inversion of the drive signal for the reflective area 21. In this configuration, it is possible to display the same image in both the areas without using a specific retardation film such as used in the related technique described in Patent Publication while.

In the above configuration of the embodiment, it is necessary to apply the LC layer 13 with a drivel voltage to use the LC layer as a 45-degree λ/4 film with respect to an incident polarized light upon display of a dark state. This narrows the cell gap of the LC layer 13 in the reflective area 21, thereby necessitating a higher drive voltage. In the present embodiment, a retardation film 18 is provided having an optical axis at an angle θ in the rage of 0 degree<θ<22.5 degree with respect to the orientation of the LC layer 13. The optical condition is such that when the LC layer 13 acting as a λ/4 film is rotated up to 45 degrees with respect to the incident polarized light upon display of a dark state, the light reflected by the reflection film 16 assumes a circularly-polarized light. More specifically, the optical axis of the retardation film 18 is deviated from the optical axis of the first polarizing film 11, to deviate the incident light incident onto the LC layer 13 from the initial orientation of the LC 13 layer by an angle of 2 θ, whereby the rotational angle of the LC layer 13 needed to display a dark state is reduced down to $\theta_{LC}=(45-2\theta)$ degrees. Thus, the drive voltage needed for rotation of the LC layer 13 in the reflective area 21 is reduced from 45 degrees by the angle of 2 θ.

Reduction of the drive voltage allows the gap between the comb-teeth electrodes to be increased, thereby enlarging the area of the LC layer 13 contributing to ON-OFF for the display. In addition, it is possible to suppress the leakage of light upon display of the dark state caused by the orientation of the LC layer 13 on the comb-teeth electrodes, thereby improving the contrast ratio of the reflective area without degrading the reflectance. Thus, the display characteristic of the LCD unit, such as the contrast ratio and viewing angle characteristic, can be improved in both the reflective and transmissive areas.

Figure 19:
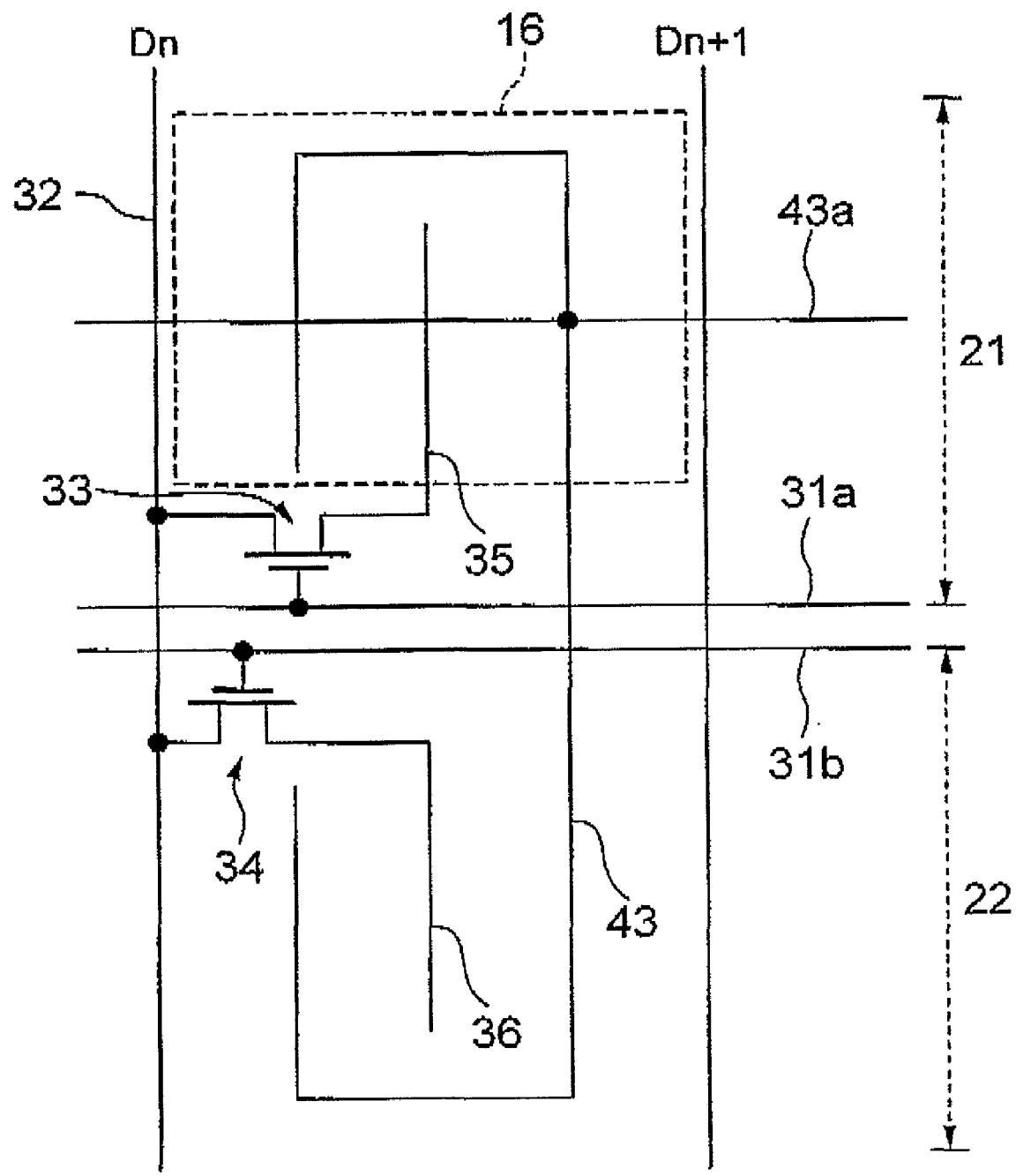
FIG. 19 is a schematic top plan view of a pixel in a transflective LCD unit according to a second exemplary embodiment of the present invention.

FIG. 19 shows a schematic top plan view of a pixel in a transflective LCD unit according to a second embodiment of the present invention. The transflective LCD unit 10a of the present embodiment is similar to the LCD unit 10 of FIG. 1 except for the planar structure of the pixel and drive voltage for the gate lines 31 and data lines 32.

In FIG. 19, gate lines 31a and 31b extend in the row direction for each row of the pixels, whereas a data line 32 extends in the column direction for each column of the pixels. TFTs 33 and 34 are provided in the vicinity of the intersection between the gate lines 31a, 31b and data lines 32. In the present embodiment, the gate lines include gate lines 31a connected to the gate of TFTs 33 provided for the reflective areas 21, and gate lines 31b connected to the gate of TFTs 34 provided for the transmissive areas 22. A TFT 33 has a source/drain path connected between the data line 32 and a pixel electrode 35 provided in the reflective area 21. The common electrode 43 provided in both the reflective area 21 and transmissive area 22 is connected to the common-electrode line (COM line) 43a. The common electrode 43 receives, via the common-electrode line (COM line) 43a, a common-electrode signal which is common to the reflective area 21 and transmissive area 22 of all the pixels in the LCD unit 10a.

Figure 20A:
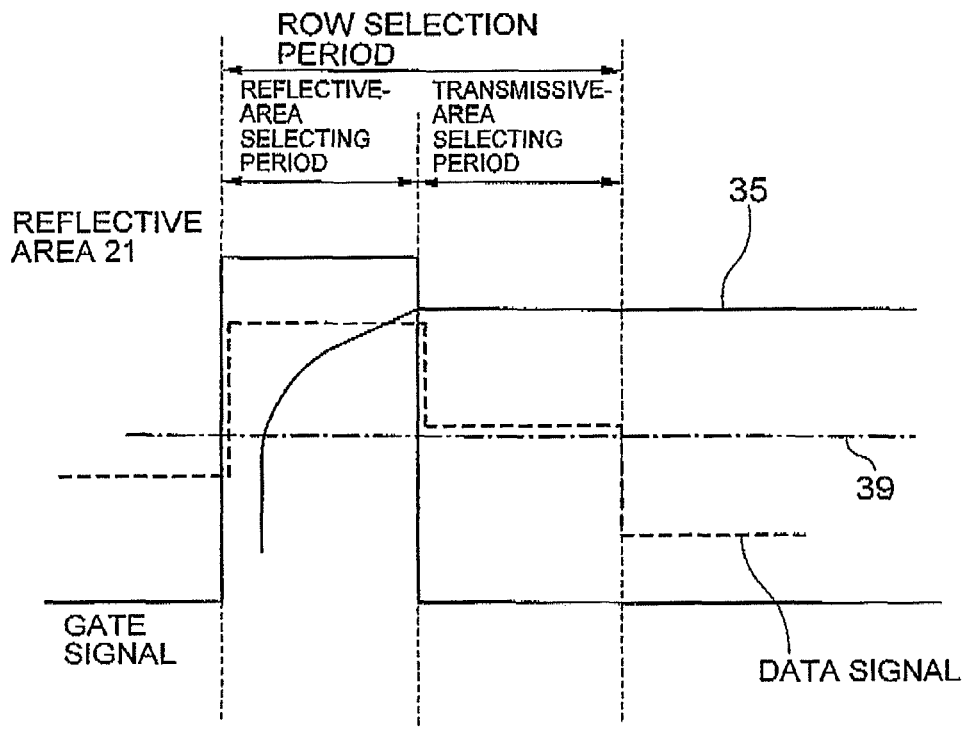
FIGS. 20A and 20B are timing charts showing the potential of the electrodes in the reflective area and transmissive area, respectively, after application of a drive signal thereto.
Figure 20B:
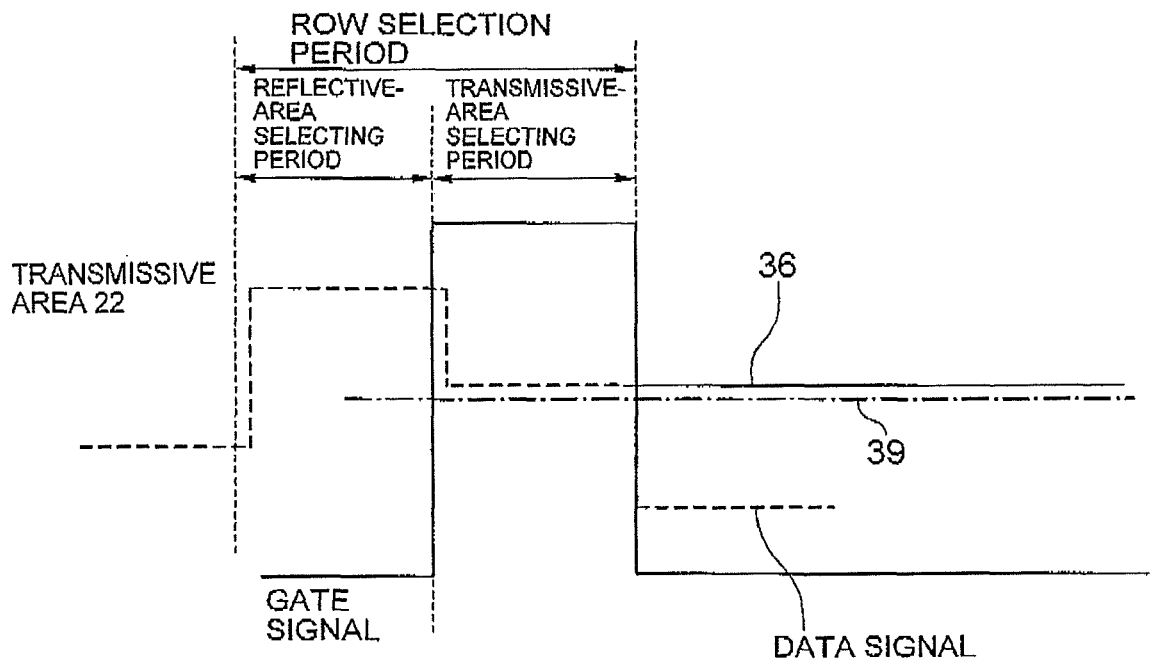

FIGS. 20A and 20B are timing charts showing the potential change of the electrodes in the reflective area 21 and transmissive area 22, respectively, during and after wiring the potential to the electrodes. In this example, a dot-inversion drive scheme is used whereby the potential of the common electrode 43 (FIG. 19) is fixed at a zero potential. In the present embodiment, the gate lines include a reflective-area gate line 31a controlling the TFTs for the reflective areas 21, and a transmissive-area gate line 31b controlling the TFTs for the transmissive areas 22. The row selection period for selecting a row of pixels is divided into two periods including a reflective-area selecting period for turn-ON of the TFTs 33, and a transmissive-area selecting period for turn-ON of the TFTs 34.

The data line 32 delivers a first data signal corresponding to the reflective area 21 and a second data signal corresponding to the transmissive area 22 in a time-division control. More specifically, the data line 32 delivers a potential signal V(63)=5V, for example, during a reflective-area selecting period and a potential signal V(0)=0V during a transmissive-area selecting period. In this configuration, in this row selection period, a 5V signal is provided to the reflective-area pixel electrode 35 during the reflective-area selecting period, whereas a 0V signal is provided to the transmissive-area electrode 36 during the transmissive-area selecting period. As shown in FIG. 20A, since the common-electrode potential is fixed at a zero potential, the LC layer 13 in the reflective area 21 is applied with 5V, whereby the reflective area 21 displays a dark state due to the normally-white mode of the reflective area 21. Similarly, as shown in FIG. 20B, since the common-electrode potential is fixed at a zero potential, the LC layer 13 in the transmissive area 22 is applied with 0V, whereby the transmissive area 22 displays a dark state due to the normally-white mode of the transmissive area 22. Thus, both the areas 21, 22 display a dark state due to the different potentials provided in the time-vision control.

Figure 21:
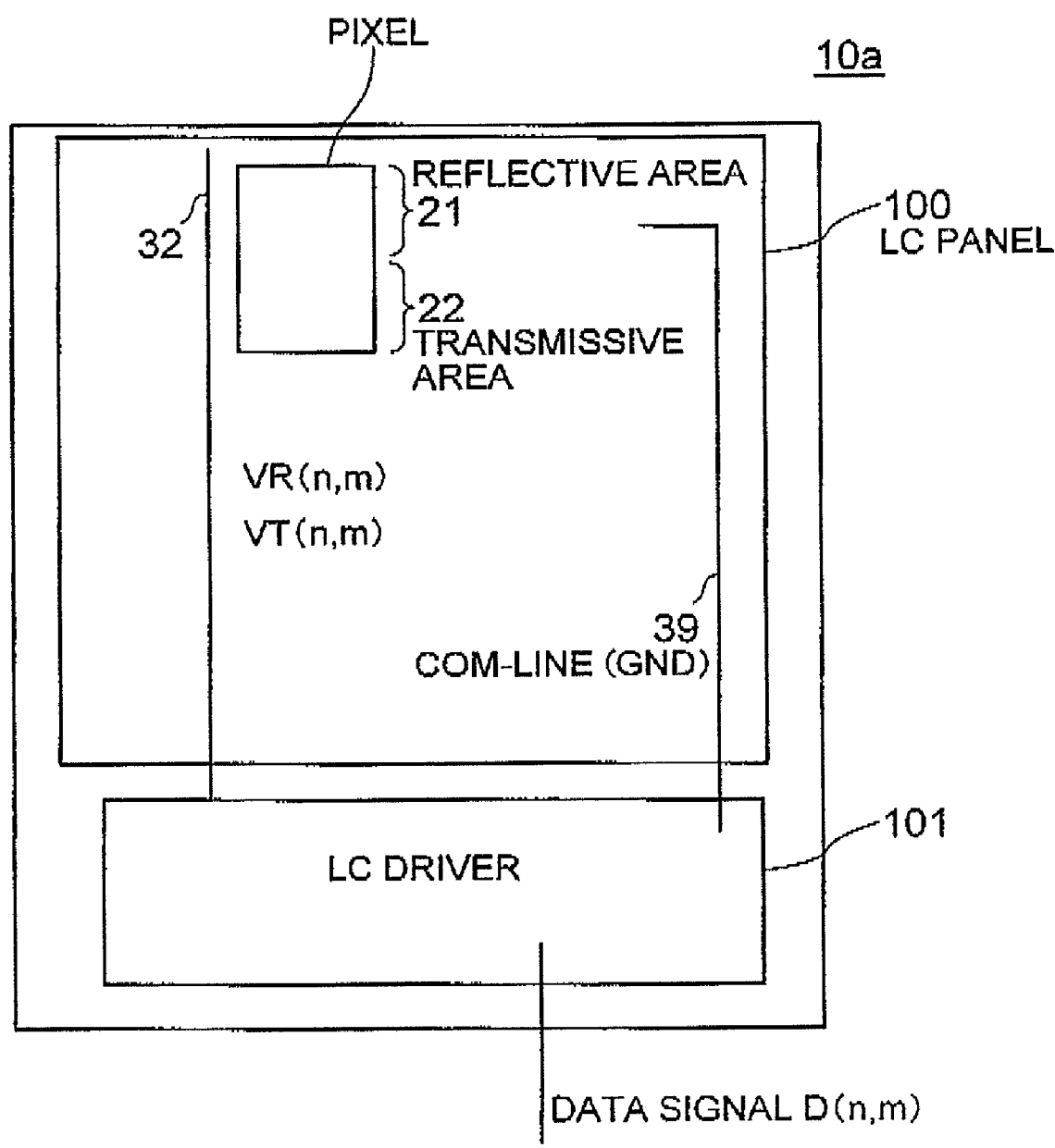
FIG. 21 is a schematic top plan view of the LCD unit that includes the pixel of FIG. 19.

A technique for generating the data signal (or reflective-area potential) for the reflective area 21 and the data signal (or transmissive-area potential) for the transmissive area 22 will be described hereinafter. FIG. 21 is a block diagram of the LCD unit 10a of the present embodiment. The LCD unit 10a includes: a LC panel 100 including a LC layer, pair of substrates sandwiching therebetween the LC layer, and a pair of polarizing films sandwiching therebetween the substrates and LC layer; and a LC driver 101 for driving the LC layer in the LC panel 100. A digital signal (D (n, m)) including 8-bit serial data for each RGB color of the pixel is supplied together with a timing signal to the LC driver 101. The LC driver 101 generates a gate signal for the gate line (not shown), a data signal for the data line 32, and a common-electrode (COM) signal for the COM line 39, based on the serial pixel signal and the timing signal.

Figure 22:
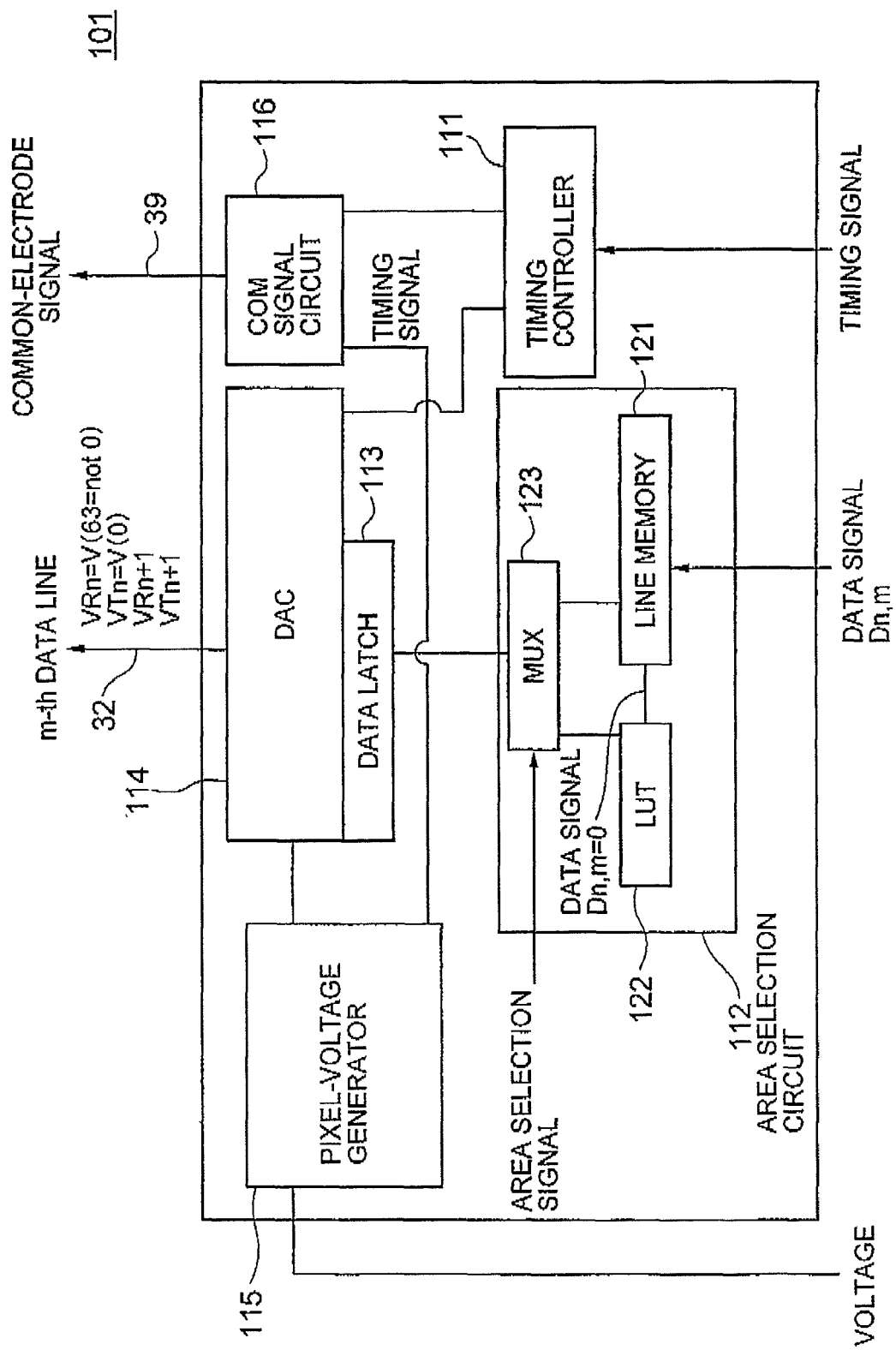
FIG. 22 is a block diagram of the LCD diver shown in FIG. 21.

FIG. 22 shows the configuration of the LC driver 101 shown in FIG. 21. The LC driver 101 includes a timing controller 111, an area selection circuit 112, a data latch circuit 113, a digital-to-analog converter (DAC) 114, a pixel-voltage generator 115, and a COM-signal generator 116. The timing controller 111 includes a gate-timing generator and a data-timing generator, and generates timing signals based on the timing signal received from outside the LCD unit. The LC driver 101 divides the row selection period for selecting a single row into the reflective-area selecting period and the transmissive-area selecting period, and drives the gate lines 31a and 31b in the respective selecting periods. The gate signals supplied to the gate line 31a for the reflective areas 21 and to the gate line 31b for the transmissive areas 22 may be generated in the LC driver 101, or may be generated by a shift register configured by a plurality of TFTs on the TFT substrate.

The area selection circuit 112 receives the digital pixel signal D (n, m) and area selection signal, delivers a reflective-area selecting signal during the reflective-area selecting period, and delivers a transmissive-area selecting signal during the transmissive-area selecting period. The data latch circuit 113 performs serial-to-parallel conversion, and delivers the digital pixel signal supplied from the area selection circuit 112 to the DAC 114. The DAC 114 generates the voltage signal (data signal) corresponding to the gray-scale level of the digital pixel signal based on the digital pixel signal delivered from the data latch circuit 113 and the voltage generated by the pixel-voltage generator 115. The COM-signal generator 116 generates the COM signal for the common electrode 43 (FIG. 19) of each pixel.

The area selection circuit 112 includes a line memory 121 for storing therein the digital pixel signals D(n, m) for a single row of pixels, a look-up-table (LUT) circuit 122 for performing a gray-scale-level conversion of the data for the reflective area 21, and a data selection circuit (MUX circuit) 123 for selecting one of the reflective-area digital pixel signal and transmissive-area pixel signal. The MUX circuit selects the reflective-area digital pixel signal D(n, m) during the reflective-area selecting period, to deliver the same to the data latch circuit 113 and DAC 114. The MUX circuit 123 selects the transmissive-area digital pixel signal during the transmissive-area selecting period, and delivers the same to the data latch circuit 113 and DAC 114.

The LUT circuit 122, upon receiving a digital pixel signal D(n, m)=0 for an n-th row/m-th column pixel in the LC driver 101, delivers a digital pixel signal which is an inversion of the received digital pixel signal D(n, m). In this operation, the LUT circuit 122 may perform a γ-conversion in addition to the inversion conversion, to thereby matching the γ-characteristic of the signal in the reflective area 21 with the γ-characteristic of the signal in the transmissive area 22 by using the LUT which tabulates γ-conversion data for each gray-scale level. The γ-conversion data in the LUT circuit 122 is exemplified herein.

| γ-conversion Table | | | | | | | | | | | | | | | | |
|---|---|---|---|---|---|---|---|---|---|---|---|---|---|---|---|---|
| Tr | 0 | ... | 7 | ... | 15 | ... | 23 | ... | 31 | ... | 39 | ... | 47 | ... | 55 | ... | 63 |
| Re | 63 | ... | 60 | ... | 56 | ... | 52 | ... | 48 | ... | 40 | ... | 32 | ... | 24 | ... | 0 |

In the table, Tr means the transmissive area, Re means reflective area, and the values in each column means the gray-scale level.

For example, if the digital pixel signal specifying D(n, m)=0 is input to the LC driver 101 for an n-th row/m-th column pixel, the area selection circuit 112 delivers a gray-scale level "63 (5 bits)", which is an inversion of the zero gray-scale level, to the reflective area 21 during the reflective-area selecting period, whereby the DAC 114 delivers Vrpix(n)=V(63)=0V as a data signal for the reflective area 21. During the transmissive-area selecting period, the area selection circuit 112 delivers a gray-scale level "0" as it is, whereby the DAC 114 delivers a data signal of Vtpix(n)=V(0)=5V to the data line as the data signal corresponding to the transmissive area 22.

Figure 23:
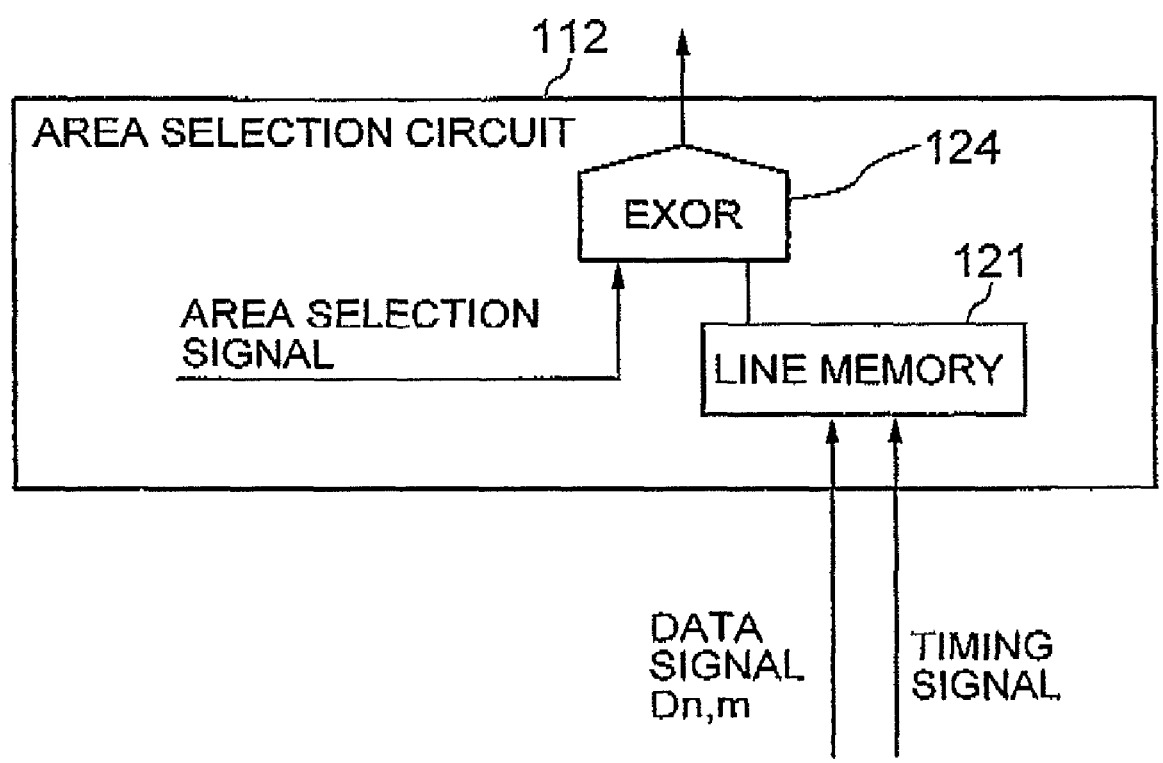
FIG. 23 is a block diagram of another example of the switching circuit shown in FIG. 22.

As described heretofore, data signals having different potentials for the reflective area 21 and transmissive area 22 can be generated from a normal digital pixel signal in the reflective-area selecting period and transmissive-area selecting period. Although the area selection circuit 112 generates the digital pixel signal for the reflective area 21 with reference to the look-up table (LUT) for the gray-scale level conversion in the present embodiment, generation of the digital pixel signal for the reflective area 21 is not restricted to this example. FIG. 23 shows another example of the configuration of the area selection circuit 112. For example, if the digital pixel signal for the reflective area 21 is generated by inverting the unit digital data, as shown in FIG. 23, the output of the line memory 121 and the reflective-area selecting signal are supplied to respective inputs of an Exclusive-OR circuit 124 to generate the reflective-area digital pixel signal. This configuration may reduce the circuit scale of the LC driver. It is to be noted that the original pixel data input to the LC driver may be the data signal for the reflective area or data signal for the transmissive area.

In the configuration of the present exemplary embodiment, the gate lines include a gate line 31a for the reflective areas 21 and a gate line 31b for the transmissive areas 22. In addition, the row selection period (write period) is divided into to two periods, during each of which the data line 32 delivers the data signal for the reflective area 21 or the data signal for the transmissive area 22 for driving one of the areas. The data signal for one of the areas 21, 22 is created from the input gray-scale level and the data signal for the other of the areas is created by inversion of the gray-scale level in the LUT circuit 122 or gray-scale level conversion circuit. This configuration allows different data signals to be written into the pixel electrodes 35, 36, whereby the LC layer 13 in the respective areas 21, 22 is applied with different drive voltages to display the same image in both the areas 21, 22.

Figure 24:
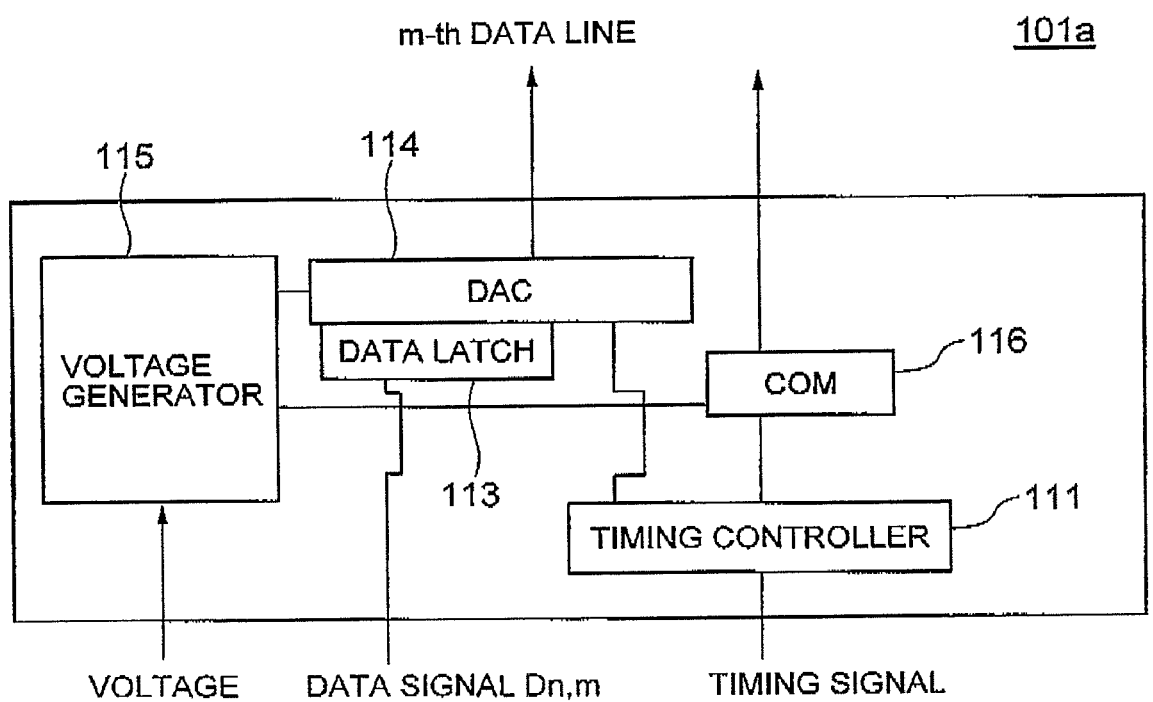
FIG. 24 is a block diagram of another example of the LCD driver shown in FIG. 21.

A transflective LCD unit according to a third exemplary embodiment of the present invention will be described hereinafter with reference to FIG. 24. The configuration of the LCD unit of the present embodiment is similar to that of the LCD unit 100 of the second embodiment except for the LC driver. The LC driver 101a in the present embodiment is obtained by removing the area selection circuit 112 from the LC driver 101 in the second embodiment. The COM-signal generator 116 supplies different potentials to the common electrode during the reflective-area selecting period and transmissive-area selecting period in a single row selection period.

Figure 25A:
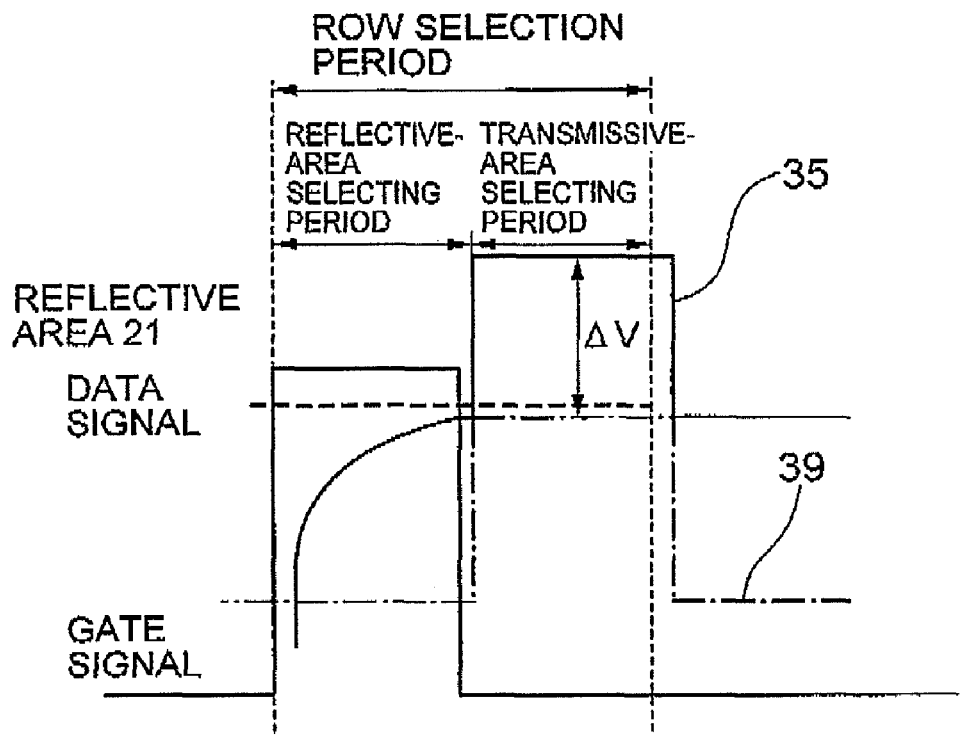
FIGS. 25A and 25B are timing charts showing potentials of the comb-teeth electrodes in the reflective area and transmissive area, respectively, after application of drive signals thereto.
Figure 25B:
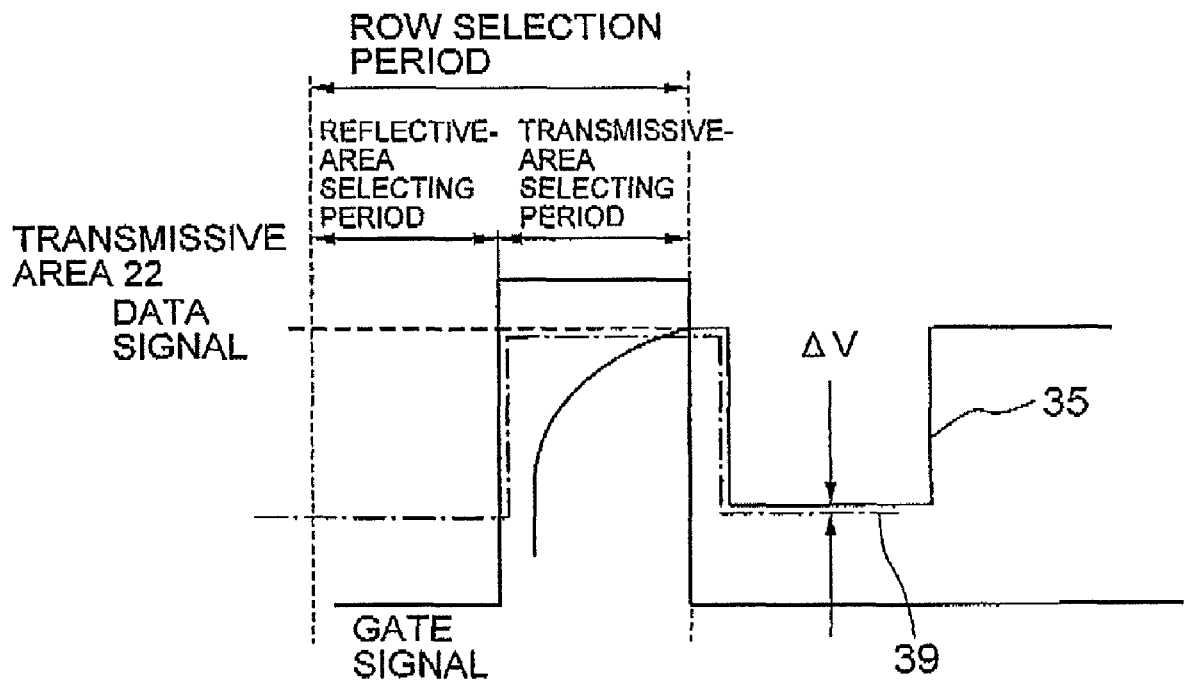
Figure 26:
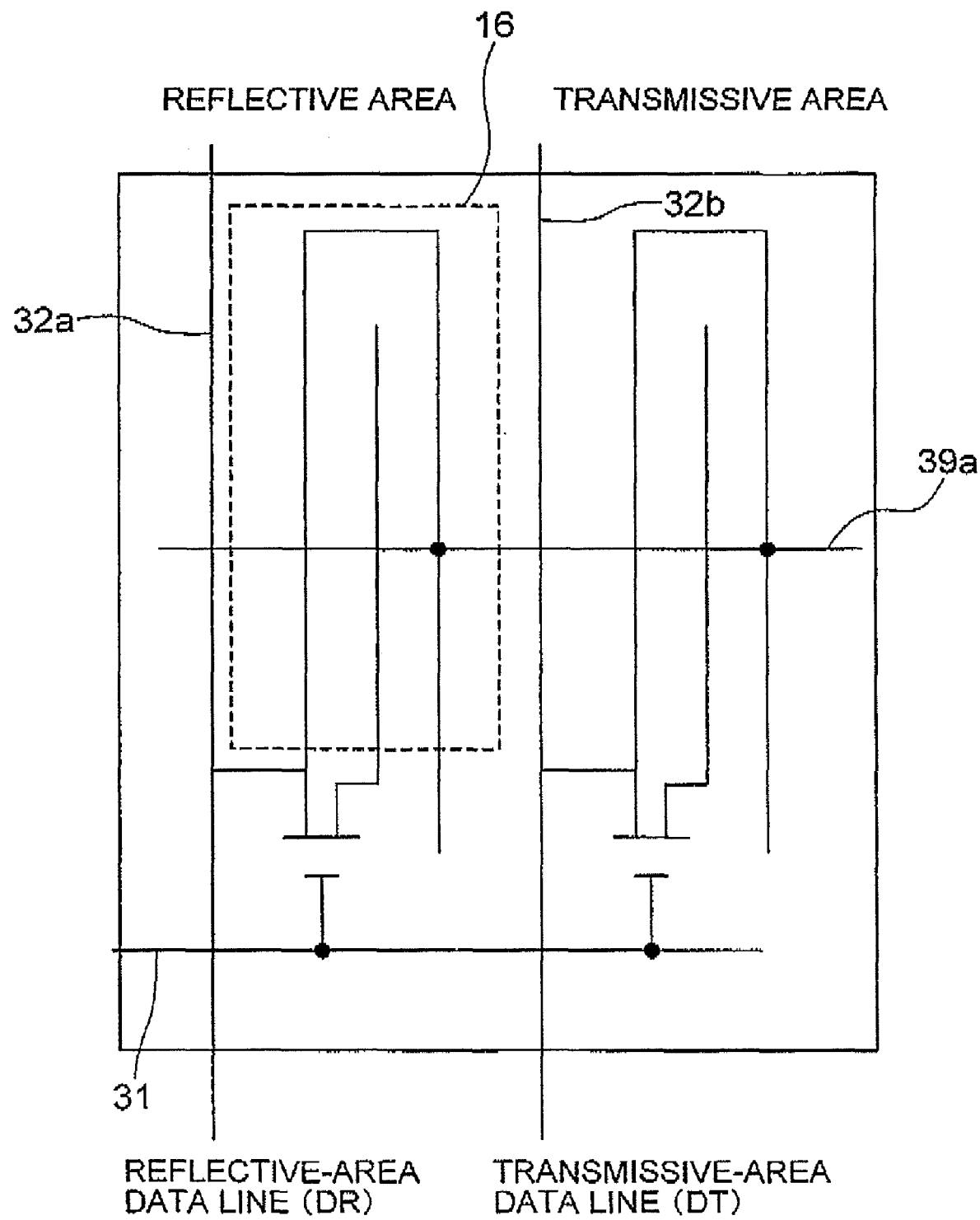
FIG. 26 is a schematic top plan view of a pixel in a LCD unit according to modification from the second exemplary embodiment.

FIGS. 25A and 25B are timing charts showing the potential change during and after the data write operation for the reflective area 21 and transmissive area 22, respectively. In this example, a gate-line-inversion drive scheme is employed. In the present embodiment, the gate lines include a gate line 31a connected to the gate of the TFTs for the reflective areas 21, and a gate line 31b connected to the gate of the TFTs for the transflective areas 22. The row selection period is divided into the reflective-area selecting period and transmissive-area selecting period, similarly to the second embodiment. In the reflective-area selecting period, the TFTs connected to the gate line 31a are turned ON, whereas in the transmissive-area selecting period, the TFTs connected to the gate line 31b are turned ON.

The data signal is supplied to the pixel electrode 35, 36 in synchrony with the row selection period, and assumes a potential of V(63)=5V during both the reflective-area selecting period and transmissive-area selecting period. The common-electrode (COM) signal is inverted for the polarity at each of transition from the reflective-area selecting period to the transmissive-area selecting period and transition from the transmissive-area selecting period to the reflective-area selecting period. For example, the common electrode 39 is applied with 5V during the transmissive-area selecting period, if the common-electrode 39 is applied with 0V during the reflective-area selecting period. In this configuration, the LC layer 13 in the reflective area 21 is applied with an electric field corresponding to 5V, to display a dark state due to the normally-white mode, whereas the LC layer 13 in the transmissive area 22 is applied with an electric field corresponding to 0V, to display a dark state due to the normally-black mode. Thus, both the areas display a dark state.

In the present exemplary embodiment, the data write period is divided into two periods, during each of which the same data signal is written into the pixel electrodes 35, 36. In addition, the potential of the common electrode 43 written into the common electrode 43 in the reflective-area selecting period is inverted to obtain the potential of the common electrode 43 written into the common electrode 43 in the transmissive-area selecting period. This configuration allows the LC layer 13 in both the areas to be applied with difference voltages by the different potential differences between the pixel electrode 35, 36 and the common electrode 43, and thereby display the same image without supplying different pixel signals to both the areas.

In the configuration of the second and third exemplary embodiments, the gate lines include a reflective-area gate line 31a and a transmissive-area gate line 31b, to thereby supply different pixel potentials to the pixel electrode in the reflective area and the pixel electrode in the transmissive area. In an alternative configuration, the data lines 32 may include a reflective-area data line 32a and a transmissive-area data line 32b which receive different pixel potentials. In this configuration, the gate lines may be different for the respective areas, or may be common to both the areas. The different data lines also allow both the areas to display the same image without providing different pixel signals.

The configuration of the present invention can be applied to a LCD device including a homogeneously oriented LC layer, wherein the LC layer has an initial orientation perpendicular or parallel to the optical axis of the first or second polarizing film. The retardation film may be an in-cell retardation film provided between transparent substrates (glass substrates) or may be one provided outside the cell structure of the LC panel.

While the invention has been particularly shown and described with reference to exemplary embodiment and modifications thereof the invention is not limited to these exemplary embodiment and modifications. It will be understood by those of ordinary skill in the art that various changes in form and details may be made therein without departing from the spirit and scope of the present invention as defined in the claims.

What is claimed is:

1. A transflective liquid crystal display (LCD) unit comprising:
 a liquid crystal (LC) panel including a LC layer driven in a lateral-electric-field mode, said LC panel defining an array of pixels on said LC layer, said pixels each including a reflective area and a transmissive area, said LC layer in said reflective area having an effective retardation of $\lambda/4$, said LC layer in said transmissive area having an effective retardation of $\lambda/2$, said LC layer in said reflective area and said LC layer in said transmissive area being driven in an inverted driving scheme, where $\lambda$ is a wavelength of light;
 first and second polarizing films sandwiching therebetween said LC panel, said first polarizing film passing the light passed by said LC layer in said reflective area and said transmissive area, said second polarizing film passing the light passed by said LC layer in said transmissive area; and
 a retardation film disposed in said reflective area between said first polarizing film and said LC layer, said retardation film providing a retardation of $\lambda/2$ to the light passed by said retardation film, wherein an angle θ between an optical axis of said retardation film and a polarized direction of the light passed by said first polarizing film and incident onto said retardation film is in a range of 0 degree<θ<22.5 degrees.

2. The transflective LCD unit according to claim 1, wherein said θ is in a range of 0 degree<θ≦10 degrees.

3. The transflective LCD unit according to claim 1, wherein said retardation film has a negative retardation.

4. The transflective LCD unit according to claim 3, wherein:
    said pixel includes at least three sub-pixels corresponding to RGB colors, said LC layer and said retardation film have retardations of $\Delta n_{1G}(550) \times d_1$ and $\Delta n_{2G}(550) \times d_2$, respectively, with respect to a light having a wavelength of 550 nm, and have retardations of $\Delta n_{1B}(450) \times d_1$ and $\Delta n_{2B}(450) \times d_2$, respectively, with respect to a light having a wavelength of 450 nm where d1 and d2 are thickness of said LC layer and said retardation film, respectively; and
    the following relationship holds:

$$|(\Delta n_{2B}(450)/450)-(\Delta n_{2G}(550)/550)| \times d_2 \leq \{(\Delta n_{1B}(450)/450)-(\Delta n_{1G}(550)/550)\} \times d_1.$$

5. The transflective LCD unit according to claim 1, wherein said retardation film has a positive retardation.

6. The transflective LCD unit according to claim 5, wherein:
    said pixel includes at least three sub-pixels corresponding to RGB colors, said retardation film have retardations of $\Delta nd_R(550)$, $\Delta nd_G(550)$ and $\Delta nd_B(550)$ in said R, G and B sub-pixels, respectively, with respect to a light having a wavelength of 550 nm; and
    the following relationship holds:

$$\Delta nd_R(550) > \Delta nd_G(550) > \Delta nd_B(550).$$

7. The transflective LCD unit according to claim 1, wherein said LC layer is homogeneously oriented.

8. The transflective LCD unit according to claim 1, wherein said LC panel includes a comb-teeth electrode for driving said LC layer; and said comb-teeth electrode includes indium-tin-oxide, or a metal having reflectance lower than a reflectance of aluminum.

9. The transflective LCD unit according to claim 1, wherein said retardation film is formed by a coating layer including LC polymer.

10. The transflective LCD unit according to claim 1, wherein said retardation film is an in-cell retardation film.

11. The transflective LCD unit according to claim 1, wherein said LC panel includes a first switching device for coupling a data line supplying a data signal to a pixel electrode disposed in said reflective area, a second switching device for coupling said data line to a pixel electrode disposed in said transmissive area, a first common electrode disposed in said reflective areas of a plurality of said pixels for receiving a first common-electrode signal, and a second common electrode disposed in said transmissive areas of said plurality of said pixels for receiving a second common-electrode signal.

12. The transflective LCD unit according to claim 11, wherein said first common-electrode signal is a substantially inversion of said second common-electrode signal.

13. The transflective LCD unit according to claim 1, wherein said LC panel includes a first switching device for coupling a data line supplying a data signal to a pixel electrode disposed in said reflective area, a second switching device for coupling said data line to a pixel electrode disposed in said transmissive area, and a common electrode disposed in said reflective areas and said transmissive areas of a plurality of said pixels for receiving a common-electrode signal.

14. The transflective LCD unit according to claim 13, wherein said LC panel includes a first control line for driving said first switching device, and a second control line for driving said second switching device.

15. The transflective LCD unit according to claim 14, wherein said common-electrode signal is inverted at a tinting of writing a pixel-electrode potential into said reflective area and at a timing of writing a pixel-electrode potential into said transmissive area by using said first and second switching devices.

16. The transflective LCD unit according to claim 14, wherein said first and second switching devices are connected to a common data line, through which a data signal supplied to said pixel electrode in said reflective area and a data signal supplied to said pixel electrode in said transmissive area are delivered in a time-division control.

17. The transflective LCD unit according to claim 1, wherein said LC panel includes a first switching device for coupling a data line supplying a data signal to a pixel electrode disposed in said reflective area, a second switching device for coupling another data line to a pixel electrode disposed in said transmissive area, and a common electrode disposed in said reflective areas and said transmissive areas of a plurality of said pixels for receiving a common-electrode signal.

18. The transflective LCD unit according to claim 16, further comprising a LC driver including an area selection circuit for converting a gray-scale level of a data signal to be supplied to one of said reflective area and said transmissive are into a desired gray-scale level for supplying said desired gray-scale level to the other of said reflective area and said transmissive area.

19. The transflective LCD unit according to claim 18, wherein:
    said area selection circuit includes a storage device for storing the data signal, and a gray-scale level conversion device for converting the data signal stored in said storage device; and
    the data signal stored in said storage device is supplied to said pixel electrode in one of said reflective area and said transmissive area, and an output of said gray-scale level conversion device is supplied to said pixel electrode in the other of said reflective area and said transmissive area.

20. The transflective LCD unit according to claim 19, wherein said gray-scale level conversion device includes a look-up table.

21. The transflective LCD unit according to claim 20, wherein said look-up table stores therein a table that tabulates a first gray-scale level in association with a second gray-scale level, said first gray-scale level having a maximum level when said second gray-scale level has a minimum level, and vice versa.

22. The transflective LCD unit according to claim 1, wherein optical axes of said polarizing films are parallel or perpendicular to an initial orientation of said LC layer.

23. The transflective LCD unit according to claim 22, wherein said reflective area operates in a normally-white mode, and said transmissive area operates in a normally-black mode.

24. The transflective LCD unit according to claim 23, wherein said initial orientation of said LC layer in said reflec tive area is rotated by an angle of (45 degrees−2×θ) upon display of a dark state.

25. The transflective LCD unit according to claim 24, wherein said retardations of said retardation film and said LC layer are designed so that said retardation film and said LC layer in said reflective area act as a λ/4 film in a state wherein said initial orientation of said LC layer is rotated by (45−2×θ) degrees.

* * * * *